US011489306B2

(12) United States Patent
    Sato

(10) Patent No.: US 11,489,306 B2
(45) Date of Patent: Nov. 1, 2022

(54) TERMINAL-EQUIPPED ELECTRIC WIRE MANUFACTURING METHOD AND TERMINAL-EQUIPPED ELECTRIC WIRE

(71) Applicant: Yazaki Corporation, Tokyo (JP)

(72) Inventor: Kei Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 126 days.

(21) Appl. No.: 17/199,366

(22) Filed: Mar. 11, 2021

(65) Prior Publication Data

US 2021/0296836 A1    Sep. 23, 2021

(30) Foreign Application Priority Data

Mar. 18, 2020  (JP) .............................. JP2020-047459

(51) Int. Cl.
    *H01R 43/02*  (2006.01)
    *H01R 11/11*  (2006.01)
    *H01R 4/18*   (2006.01)

(52) U.S. Cl.
    CPC ......... *H01R 43/0221* (2013.01); *H01R 4/184* (2013.01); *H01R 11/11* (2013.01)

(58) Field of Classification Search
    CPC ............ H01R 43/0221; H01R 43/0214; H01R 43/02; H01R 4/184; H01R 4/185; H01R 4/187; H01R 11/11
    USPC ....... 439/877, 352, 345, 346, 362, 364, 578, 439/619, 660, 678, 699.1, 708, 723, 290, 439/607.01, 850, 852
    See application file for complete search history.

(56) References Cited

U.S. PATENT DOCUMENTS

| 4,966,565 | A   |   | 10/1990 | Dohi |               |
|-----------|-----|---|---------|------|---------------|
| 7,927,127 | B1  | * | 4/2011  | Glick ...................... | H01R 4/245 |
|           |     |   |         |      | 439/397       |
| 9,601,854 | B2  | * | 3/2017  | Kutsuna ................. | H01R 13/11 |
| 2003/0054684 | A1 | * | 3/2003  | Yamanashi .......... | H01R 4/2466 |
|           |     |   |         |      | 439/397       |
| 2015/0017833 | A1 | * | 1/2015  | Sato ....................... | H01R 13/52 |
|           |     |   |         |      | 439/519       |
| 2015/0064991 | A1 | * | 3/2015  | Kawamura ........ | H01R 43/0221 |
|           |     |   |         |      | 439/879       |
| 2015/0357725 | A1 | * | 12/2015 | Matsuo ................. | H01R 4/187 |
|           |     |   |         |      | 439/877       |

(Continued)

FOREIGN PATENT DOCUMENTS

| JP | S62-55878 A   | 3/1987 |
|----|---------------|--------|
| JP | H02-103876 A  | 4/1990 |

(Continued)

*Primary Examiner* — Harshad C Patel
(74) *Attorney, Agent, or Firm* — Kenealy Vaidya LLP

(57) ABSTRACT

A terminal-equipped electric wire manufacturing method includes: an electric wire installation step of inserting a core-wire exposed part between inner wall surfaces of piece parts of a core-wire connection body, the core-wire exposed part having a core-wire diameter smaller than an interval between the inner wall surfaces of the piece parts; a melting step of melting the core-wire exposed part and the core-wire connection body by emitting a laser beam to the core-wire exposed part and the core-wire connection body from a free end side of each piece part; and a fixation step of fixing the core-wire exposed part and the core-wire connection body thus melted, with the emission of the laser beam stopped.

6 Claims, 27 Drawing Sheets

(56) References Cited

U.S. PATENT DOCUMENTS

2017/0179664 A1* 6/2017 Miyakawa .............. B05D 3/067
2020/0014130 A1* 1/2020 Sato ........................ H01R 4/62

FOREIGN PATENT DOCUMENTS

JP        H06-56969 U    8/1994
JP        2000-251959 A    9/2000

* cited by examiner

TERMINAL-EQUIPPED ELECTRIC WIRE MANUFACTURING METHOD AND TERMINAL-EQUIPPED ELECTRIC WIRE

CROSS-REFERENCE TO RELATED APPLICATION(S)

The present application claims priority to and incorporates by reference the entire contents of Japanese Patent Application No. 2020-047459 filed in Japan on Mar. 18, 2020.

BACKGROUND OF THE INVENTION

1. Field of the Invention

The present invention relates to a terminal-equipped electric wire manufacturing method and a terminal-equipped electric wire.

2. Description of the Related Art

In a conventionally known terminal-equipped electric wire, a terminal fitting is physically and electrically connected with a terminal of an electric wire. In the terminal-equipped electric wire, for example, an electric wire connection body and a core wire of the electric wire at the terminal are physically and electrically connected by laser welding. For example, such terminal-equipped electric wires are disclosed in Japanese Unexamined Utility Model Application Laid-open No. H6-56969 and Japanese Patent Application Laid-open No. S62-55878 below. In the terminal-equipped electric wire disclosed in Japanese Unexamined Utility Model Application Laid-open No. H6-56969, the core wire of the terminal of an electric wire squashed to a flat shape in advance is placed on a bottom part of the electric wire connection body, temporarily fastened to the electric wire connection body by a piece body of a bent terminal fitting, and then laser-welded with the electric wire connection body. In the terminal-equipped electric wire disclosed in Japanese Patent Application Laid-open No. S62-55878, the core wire of the terminal of an electric wire is fitted and temporarily fastened to a housing part of the electric wire connection body smaller than the diameter of the core wire and then laser-welded with the electric wire connection body. Accordingly, in a conventional terminal-equipped electric wire, the core wire of the terminal of the electric wire and the electric wire connection body are temporarily fixed before laser welding to increase the accuracy of the position of connection between the components, thereby making it possible to prevent decrease of the quality of conduction between the electric wire and the terminal fitting.

In a conventional terminal-equipped electric wire, the electric wire connection body is part of the body of the terminal fitting, and the body and the core wire are welded through laser beam irradiation. Thus, in the conventional terminal-equipped electric wire, a laser beam needs to have an intensity for melting only the electric wire connection body as part of the body of the terminal fitting, and in addition, influence of an emitted laser beam on a peripheral part needs to be considered. For example, in the conventional terminal-equipped electric wire, when an electric wire is welded to the terminal fitting being housed in a housing made of synthesis resin, thermal influence of the laser beam on the housing needs to be considered, and thus the intensity of the laser beam needs to be weakened or the irradiation range of the laser beam needs to be narrowed. Accordingly, in the conventional terminal-equipped electric wire, improvement is likely to be required for the state of connection between the core wire and the electric wire connection body, which provides room for improvement of the quality of conduction between the electric wire and the terminal fitting.

SUMMARY OF THE INVENTION

Thus, the present invention is intended to provide a terminal-equipped electric wire manufacturing method and a terminal-equipped electric wire that are capable of improving the quality of conduction.

To solve the problem, a terminal-equipped electric wire manufacturing method according to one aspect of the present invention includes an electric wire installation step of inserting a core-wire exposed part of a core wire of an electric wire at a terminal between inner wall surfaces of a pair of piece parts of a terminal fitting including a core-wire connection body formed of a bottom part and the piece parts protruding from both ends of the bottom part, the electric wire having a core-wire diameter smaller than an interval between the inner wall surfaces of the piece parts; a melting step of melting the core-wire exposed part and the core-wire connection body by emitting a laser beam to the core-wire exposed part and the core-wire connection body from a free end side of each piece part; and a fixation step of fixing the core-wire exposed part and the core-wire connection body melted by the laser beam, with the emission of the laser beam stopped, wherein at the electric wire installation step, the core-wire exposed part is inserted between the inner wall surfaces of the piece parts, disposed on a bottom part side compared to an end part of a holding part of the core-wire connection body on a laser beam irradiation side, and temporarily held to the core-wire connection body by the holding part, at the melting step, the laser beam is emitted to the core-wire exposed part and the holding part to melt the core-wire exposed part and the holding part, and at the fixation step, the core-wire exposed part and the holding part melted by the laser beam are fixed.

According to another aspect of the present invention, in the terminal-equipped electric wire manufacturing method, it is preferable that at the electric wire installation step, the core-wire exposed part is sandwiched between the holding parts protruding from inner wall surface sides of the piece parts and oppositely disposed in an opposite disposition direction of the piece parts.

According to still another aspect of the present invention, in the terminal-equipped electric wire manufacturing method, it is preferable that at the electric wire installation step, the core-wire exposed part is sandwiched between the bottom part and each of the holding parts protruding from inner wall surface sides of the piece parts and disposed opposite to an inner wall surface of the bottom part.

According to still another aspect of the present invention, in the terminal-equipped electric wire manufacturing method, it is preferable that at the electric wire installation step, the core-wire exposed part of the core wire including a plurality of strands is inserted between the inner wall surfaces of the piece parts.

To solve the problem, a terminal-equipped electric wire according to still another aspect of the present invention includes an electric wire; and a terminal fitting including a core-wire connection body formed of a bottom part and a pair of piece parts protruding from both ends of the bottom part, the terminal fitting being configured to physically and electrically connect a core-wire exposed part of a core wire of the electric wire at a terminal to the core-wire connection body on an inner wall surface side of the bottom part and inner wall surface sides of the piece parts, wherein the core-wire connection body includes a second fixation region fixed to a first fixation region that has been melted on the core-wire exposed part and between inner wall surfaces of the piece parts.

To solve the problem, a terminal-equipped electric wire according to still another aspect of the present invention includes an electric wire; and a terminal fitting including a core-wire connection body formed of a bottom part and a pair of piece parts protruding from both ends of the bottom part, the terminal fitting being configured to physically and electrically connect a core-wire exposed part of a core wire of the electric wire at a terminal to the core-wire connection body on an inner wall surface side of the bottom part and inner wall surface sides of the piece parts, wherein a melted-fixed part in which a component containing a metallic material same as a metallic material of the core-wire connection body and the core-wire exposed part are melted and then fixed is provided inside of the core-wire connection body, the core-wire connection body includes protrusion parts protruding from the inner wall surface sides of the piece parts, and the protrusion parts each include a solidified surface that is melted and then solidified.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a terminal-equipped electric wire manufacturing method and a terminal-equipped electric wire according to the present invention will be described below in detail with reference to the accompanying drawings. The present invention is not limited to the present embodiment.

EMBODIMENT

One embodiment of a terminal-equipped electric wire manufacturing method and a terminal-equipped electric wire according to the present invention will be described below with reference to FIGS. 1 to 5.

Figure 1:
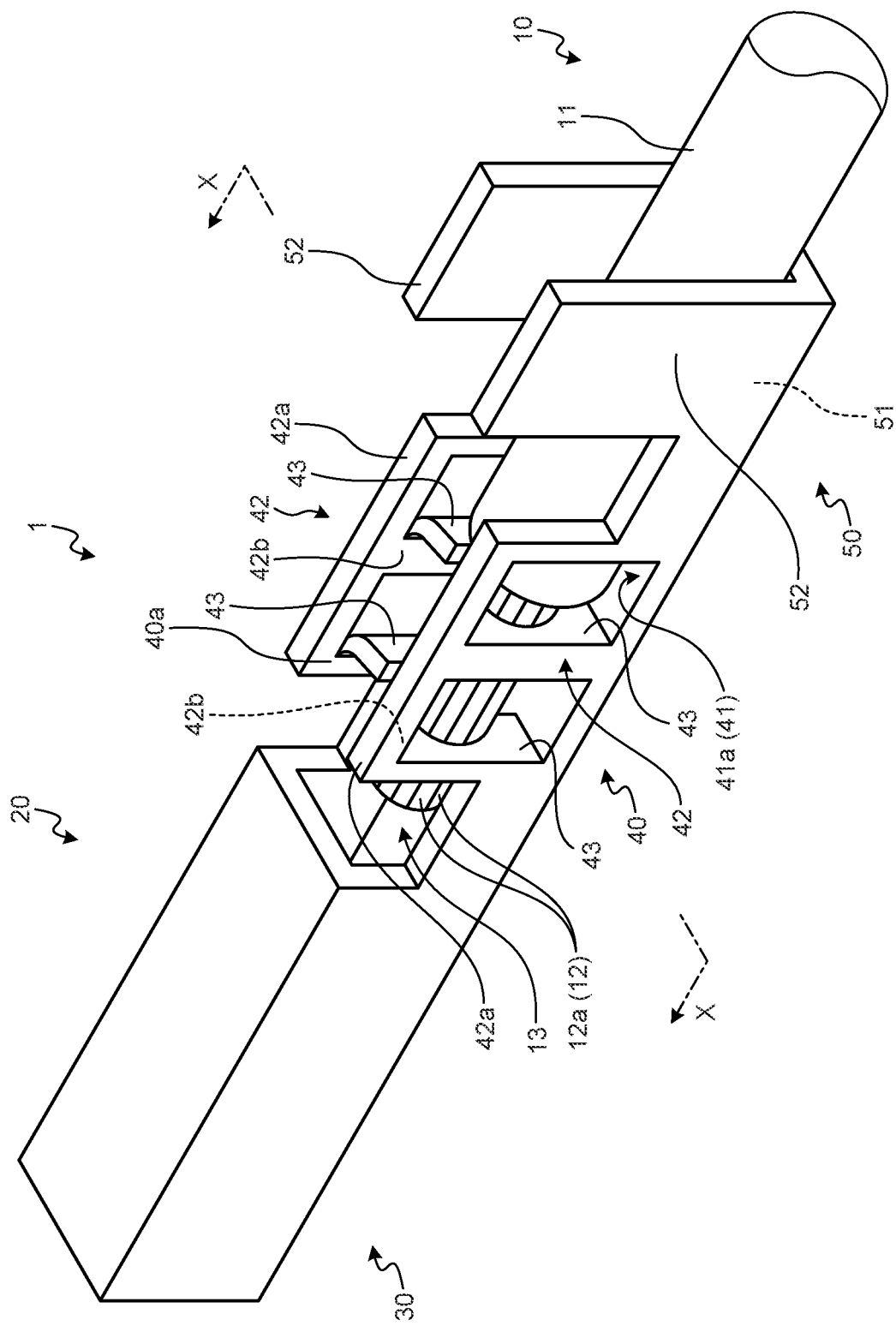
FIG. 1 is a perspective view illustrating a terminal-equipped electric wire of an embodiment in a state before being subjected to a melting step, a fixation step, and a press bonding step.

Reference sign 1 in FIG. 1 denotes the terminal-equipped electric wire of the present embodiment. This terminal-equipped electric wire 1 is manufactured by a manufacturing method to be described later.

The terminal-equipped electric wire 1 includes an electric wire 10 and a terminal fitting 20 physically and electrically connected with each other (FIG. 1).

At a terminal of the electric wire 10, a cover 11 is removed to expose a core wire 12 (FIG. 1). The core wire 12 may be a cylindrical bundle of a plurality of strands each made of a conductive metal wire rod or may be one cylindrically shaped bar conductor. The core wire 12 in this example is made of a plurality of strands 12a. In the electric wire 10, a part of the core wire 12 at which the cover 11 is removed at the terminal is referred to as a "core-wire exposed part 13".

The terminal fitting 20 is formed of a metallic material such as a metal plate. The terminal fitting 20 includes a terminal connection body 30 physically and electrically connected with a terminal connection body of a counterpart terminal fitting (not illustrated), a core-wire connection body 40 physically and electrically connected with the core-wire exposed part 13 at the terminal of the electric wire 10, and a cover connection body 50 physically connected with the cover 11 at the terminal of the electric wire 10 (FIGS. 1 and 2).

For example, one of the terminal connection body 30 of the terminal fitting 20 and the terminal connection body of the counterpart terminal fitting is formed in a female terminal shape, and the other is formed in a male terminal shape so that the terminal connection bodies are engaged with each other by insertion. In this example, the terminal connection body 30 of the terminal fitting 20 is formed in a female terminal shape, and the terminal connection body of the counterpart terminal fitting is formed in a male terminal shape.

Figure 2:
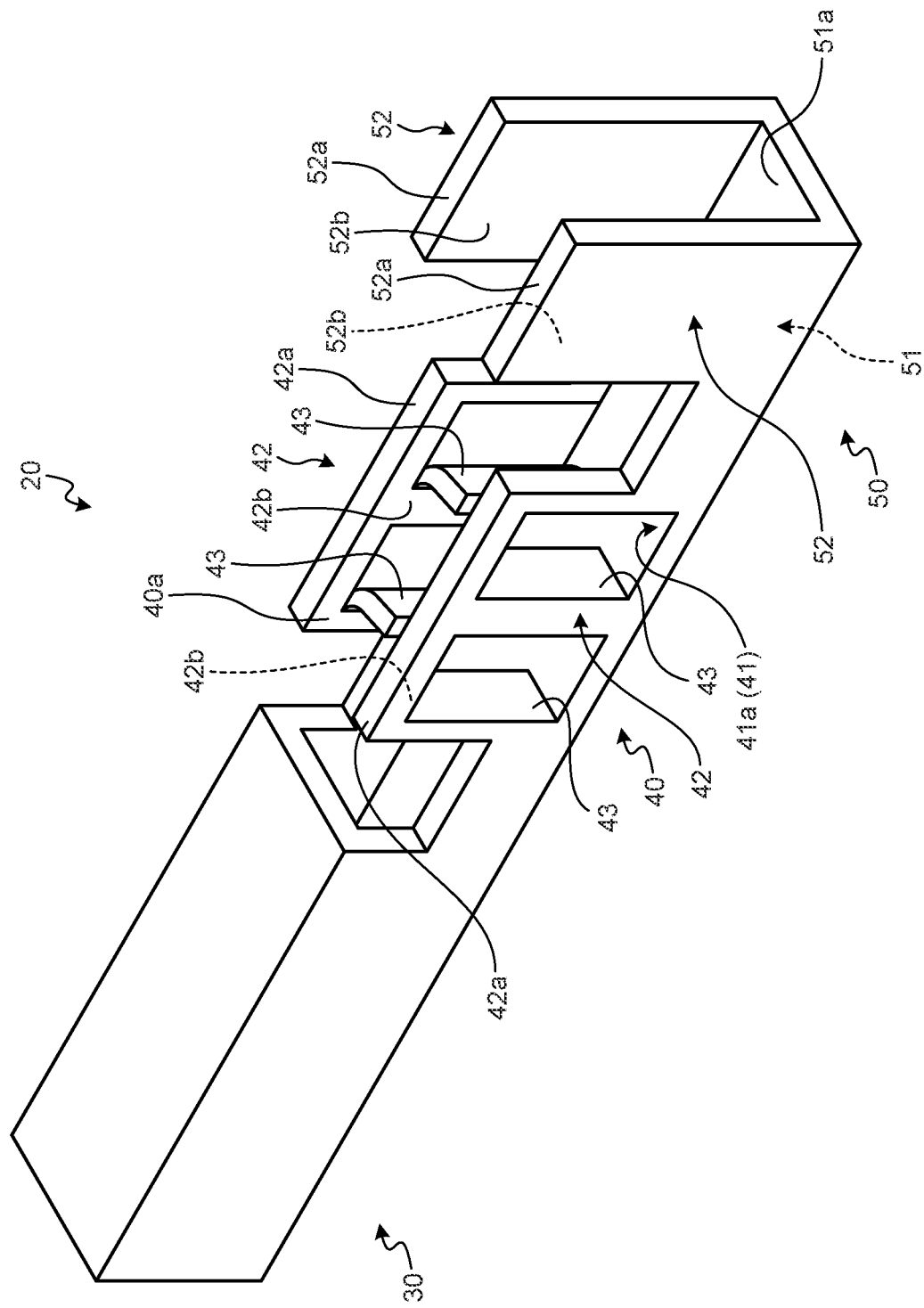
FIG. 2 is a perspective view illustrating a terminal fitting of the embodiment.

The core-wire connection body 40 mainly includes a bottom part 41 and a pair of piece parts 42, 42 protruding from both ends of the bottom part 41 (FIGS. 1 and 2). The core-wire exposed part 13 is housed in a space surrounded by the bottom part 41 and the pair of piece parts 42, 42. The core-wire connection body 40 in this example is mainly formed in a plate shape of a U figure constituted by the bottom part 41 and the pair of piece parts 42, 42.

Figure 3:
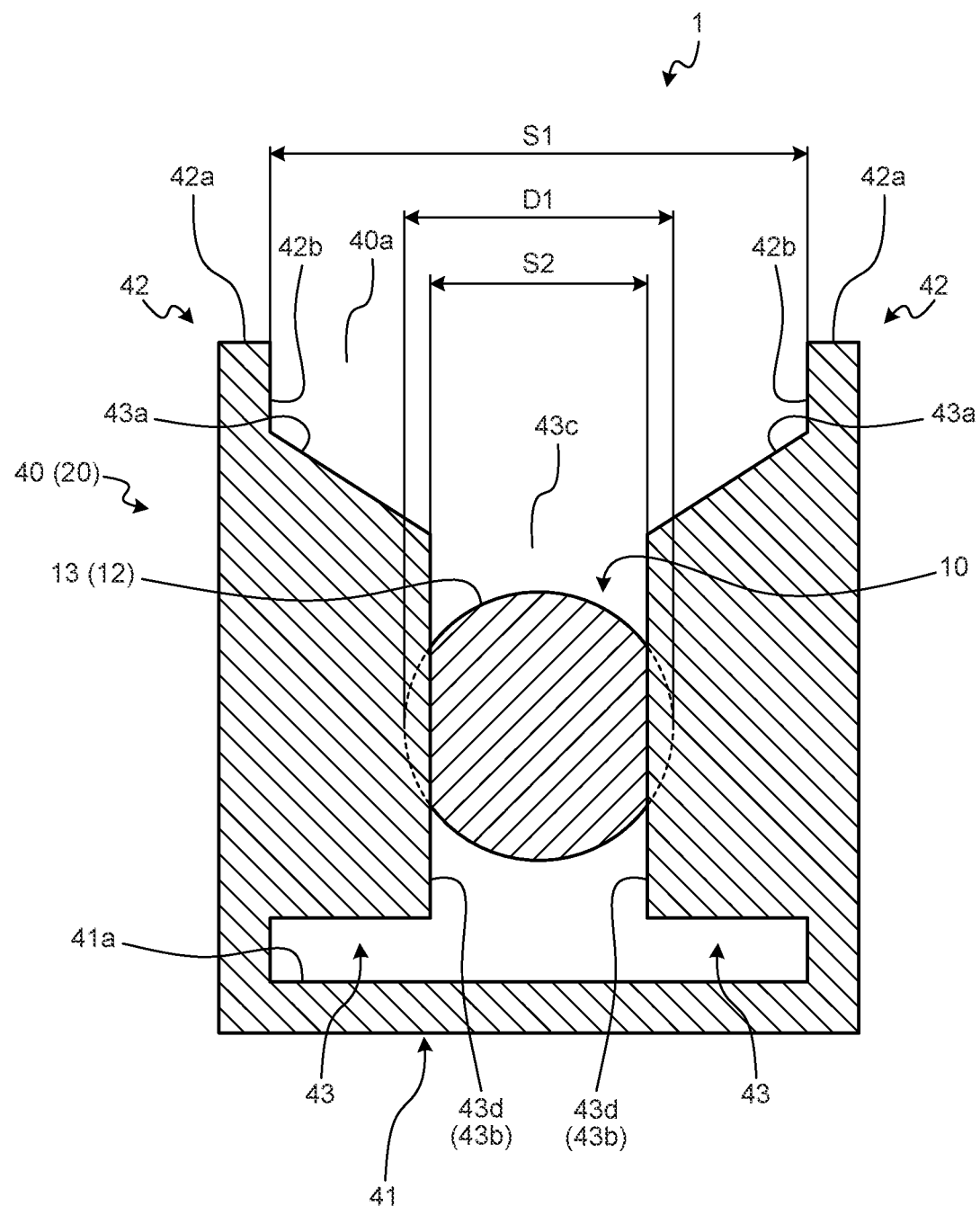
FIG. 3 is a cross-sectional view taken along line X-X in FIG. 1, illustrating a core-wire exposed part and a core-wire connection body of the embodiment before being subjected to the melting step and the fixation step.
Figure 4:
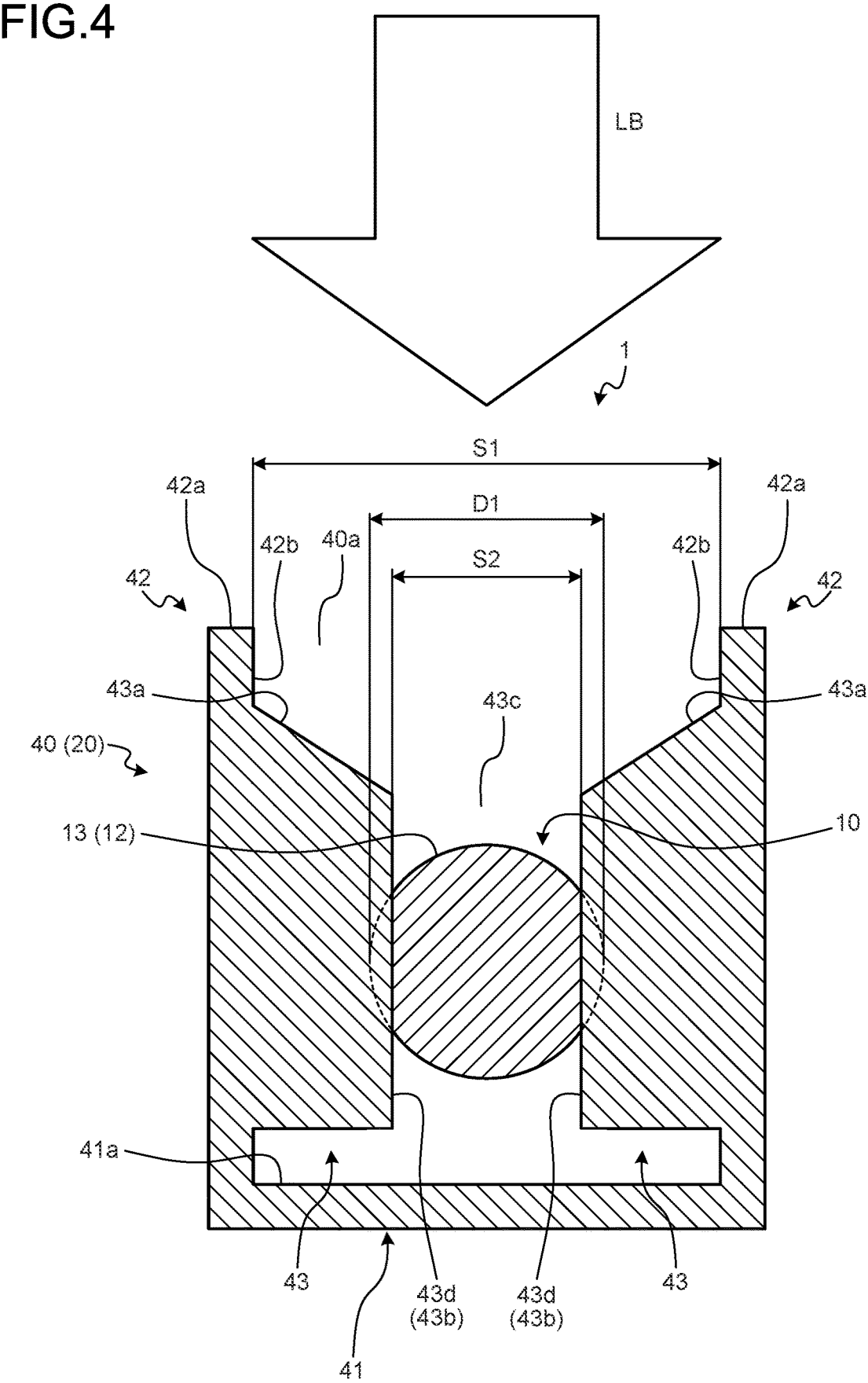
FIG. 4 is a cross-sectional view illustrating the core-wire exposed part and the core-wire connection body of the embodiment in the melting step.

In the core-wire connection body 40, for example, the core-wire exposed part 13 is inserted between inner wall surfaces 42b, 42b through an opening 40a between free ends 42a, 42a of the respective piece parts 42, 42 (FIGS. 2 to 4). The core-wire exposed part 13 is physically and electrically connected with the core-wire connection body 40 on an inner wall surface 41a side of the bottom part 41 and the inner wall surface 42b, 42b sides of the piece parts 42, 42. In the core-wire connection body 40, the core-wire exposed part 13 inserted inside is temporarily held by a holding part 43 to be described later, and thus the core-wire exposed part 13 may be placed on the inner wall surface (bottom surface) 41a of the bottom part 41 or may be placed separately above the inner wall surface 41a of the bottom part 41.

The piece parts 42, 42 protrude in the same direction from both ends of the bottom part 41 and are oppositely disposed at an interval S1 between the inner wall surfaces 42b, 42b (FIGS. 3 and 4). Thus, a connection target of the terminal fitting 20 is the electric wire 10, the core wire 12 (core-wire exposed part 13) of which has a core-wire diameter D1 smaller than the interval S1 between the inner wall surfaces 42b, 42b of the piece parts 42, 42. The core-wire connection body 40 in this example is formed so that the bottom part 41 and the pair of piece parts 42, 42 have rectangular flat plate shapes and the same plate thickness.

The core-wire connection body 40 further includes the holding parts 43, 43 configured to temporarily hold the core-wire exposed part 13 housed in the inner space between the inner wall surfaces 42b, 42b of the piece parts 42, 42 (FIGS. 1 to 4). The holding parts 43, 43 of the present embodiment protrude from the inner wall surface 42b, 42b sides of the piece parts 42, 42, respectively, and are oppositely disposed in the opposite disposition direction of the piece parts 42, 42 (FIGS. 3 and 4). The core-wire exposed part 13 is sandwiched between the holding parts 43, 43 of the present embodiment in their opposite disposition direction so that the core-wire exposed part 13 is temporarily held between the inner wall surfaces 42b, 42b of the piece parts 42, 42. The holding parts 43, 43 of the present embodiment include end parts 43a, 43a, respectively, on the opening 40a side of each piece part 42, 42 and a laser beam irradiation side to be described later. The holding parts 43, 43 sandwich the core-wire exposed part 13 on the bottom part 41 side of the end parts 43a, 43a.

Specifically, the holding parts 43, 43 of the present embodiment include press fitting parts 43b, 43b respectively, that are end parts in their protrusion direction and oppositely disposed in their opposite disposition direction at an interval S2 smaller than a core-wire diameter D1 of the core wire 12 (core-wire exposed part 13) so that the core-wire exposed part 13 is fitted by pressing in a gap of the interval S2 (FIGS. 3 and 4). Accordingly, the core-wire exposed part 13 is sandwiched between the holding parts 43, 43 when the core-wire exposed part 13 is fitted by pressing between the press fitting parts 43b, 43b. A press fitting opening 43c in which the core-wire exposed part 13 inserted through the opening 40a is fitted by pressing between the press fitting parts 43b, 43b is formed on the opening 40a side of the piece part 42, 42 of each press fitting part 43b, 43b.

In each holding part 43, 43, a part of the end part 43a, 43a on the protrusion direction side may be formed as a part of the press fitting part 43b, 43b, or the end part 43a, 43a and the press fitting part 43b, 43b may be separately formed. In each holding part 43, 43 in this example, the press fitting part 43b, 43b is formed on the bottom part 41 side of the end part 43a, 43a.

An end part of each end part 43a in this example on the protrusion direction side is formed in a tilted shape that gradually approaches from the inner wall surface 42b side of the corresponding piece part 42, 42 to the press fitting part 43b side as the position moves from the opening 40a side of the piece part 42, 42 to the bottom part 41 side. The press fitting opening 43c is formed between boundary parts each between the end part of the corresponding end part 43a, 43a on the protrusion direction side and the corresponding press fitting part 43b, 43b. Accordingly, the end parts of the end parts 43a, 43a on the protrusion direction side can be used as guide parts by which the core-wire exposed part 13 inserted through the opening 40a between the piece parts 42 is guided to the press fitting opening 43c.

Each press fitting part 43b, 43b in this example is extended in the protrusion direction of the corresponding piece part 42, 42 and formed to have a length longer than the core-wire diameter D1 of the core wire 12 (core-wire exposed part 13) in the protrusion direction. Thus, the core-wire exposed part 13 can be sandwiched between the press fitting parts 43b, 43b on the bottom part 41 side compared to the end parts of the end parts 43a, 43a and end parts of the press fitting parts 43b, 43b on the press fitting opening 43c side.

Each holding part 43, 43 in this example is formed in a flat plate shape having a plane in the protrusion direction of the corresponding piece part 42, 42 and the opposite disposition direction thereof, and protrudes from the inner wall surface 42b, 42b of the piece part 42, 42 so that its end part in the protrusion direction is used as the press fitting part 43b, 43b. Each holding part 43, 43 in this example is formed by providing a cut to the corresponding piece part 42, 42 except for one side thereof and bending a piece body surrounded by a cut from the one side.

For example, the press fitting parts 43b, 43b include end faces 43d, 43d, respectively, extending from the press fitting opening 43c toward a direction opposite the protrusion direction of the piece parts 42, 42, and the core-wire exposed part 13 is fitted by pressing between the end faces 43d, 43d (FIGS. 3 and 4). Specifically, the end faces 43d, 43d are formed as what is called press contact blades that dig into the strands 12a of the core-wire exposed part 13 without cutting the strands 12a.

The core-wire connection body 40 includes at least one pair of the holding parts 43, 43. In this example, two pairs of the holding parts 43, 43 are provided at an interval in an axis line direction of the core-wire exposed part 13 (direction orthogonal to the protrusion direction and the opposite disposition direction of the piece parts 42, 42).

The cover connection body 50 includes a barrel bottom part 51 and a pair of barrel piece parts 52, 52 protruding from both ends of the barrel bottom part 51 (FIGS. 1 and 2). The cover connection body 50 is formed in a plate shape of a U figure constituted by the barrel bottom part 51 and the pair of barrel piece parts 52, 52 before connection with the cover 11 at the terminal of the electric wire 10 (before being physically connected with the cover 11 at the terminal of the electric wire 10). For example, a part with the cover 11 at the terminal of the electric wire 10 is inserted inside the cover connection body 50 through an opening between free ends 52a, 52a of the respective barrel piece parts 52, 52 and placed on an inner wall surface (bottom surface) 51a of the barrel bottom part 51. The cover 11 at the terminal of the electric wire 10 is physically connected with the cover connection body 50 on the inner wall surface 51a side of the barrel bottom part 51 and the inner wall surface 52b, 52b sides of the barrel piece parts 52, 52.

The barrel piece parts 52, 52 protrude in the same direction from both ends of the barrel bottom part 51 and are oppositely disposed at an interval between the inner wall surfaces 52b, 52b. The cover connection body 50 in this example is formed so that the barrel bottom part 51 and the pair of barrel piece parts 52, 52 have rectangular flat plate shapes and the same plate thickness.

In the terminal-equipped electric wire 1, the terminal of the electric wire 10 is installed in the core-wire connection body 40 and the cover connection body 50, the core-wire exposed part 13 and the core-wire connection body 40 are welded to each other, and then the cover 11 at the terminal of the electric wire 10 and the cover connection body 50 are bonded to each other by pressing. Thus, the method of manufacturing the terminal-equipped electric wire 1 includes an electric wire installation step of installing the terminal of the electric wire 10 in the core-wire connection body 40 and the cover connection body 50. In addition, the method of manufacturing the terminal-equipped electric wire 1 includes a melting step and a fixation step of welding the core-wire exposed part 13 and the core-wire connection body 40 to each other and also includes a press bonding step of bonding the cover 11 at the terminal of the electric wire 10 and the cover connection body 50 to each other by pressing.

The electric wire installation step may be performed on the terminal fitting 20 placed on an installation table (not illustrated) such as a jig or housed in a housing (not illustrated) such as a housing box made of synthesis resin by a worker holding the electric wire 10 or by a device holding the electric wire 10 with an arm or the like.

In the electric wire installation step in this example, the core-wire exposed part 13 of the core wire 12 including the strands 12a is inserted between the inner wall surfaces 42b, 42b of the piece parts 42, 42. Accordingly, in the electric wire installation step in this example, the core-wire exposed part 13 is inserted toward the inner side of the core-wire connection body 40 to avoid unravel of the strands 12a.

In addition, in the electric wire installation step, the core-wire exposed part 13 is inserted between the inner wall surfaces 42b, 42b of the piece parts 42, 42 so that the core-wire exposed part 13 is disposed on the bottom part 41 side of the end parts 43a, 43a of the holding parts 43, 43 on the laser beam irradiation side and temporarily held in the core-wire connection body 40 by the holding parts 43, 43 (FIGS. 3 and 4).

In the electric wire installation step in this example, the core-wire exposed part 13 is inserted through the opening 40a between the piece parts 42, 42, fitted by pressing between the end faces 43d, 43d of the press fitting parts 43b, 43b through the press fitting opening 43c, and sandwiched between the holding parts 43, 43. In this electric wire installation step, the core-wire exposed part 13 is fitted by pressing toward the bottom part 41 side of the end parts of the press fitting parts 43b, 43b on the press fitting opening 43c side, and accordingly, temporarily held on the bottom part 41 side compared to the end parts 43a, 43a and the end parts of the press fitting parts 43b, 43b on the press fitting opening 43c side.

In the manufacturing method, any of the melting and fixation steps and the press bonding step may be performed first. For example, in the press bonding step, the part with the cover 11 at the terminal of the electric wire 10 extends in the axis line direction when the cover connection body 50 is swaged and bonded by pressing to the cover 11 at the terminal of the electric wire 10 as described later. Thus, in the manufacturing method, the melting step and the fixation step may be performed after the press bonding step with taken into account the extension of the electric wire 10 unless the state in which the core-wire exposed part 13 is temporarily held by the holding parts 43, 43 is not encumbered. In the terminal-equipped electric wire 1, the electric wire 10 is pulled in the axis line direction to the outside from the cover connection body 50. Thus, in the press bonding step, the part with the cover 11 at the terminal can be extended in the direction in which the electric wire 10 is pulled out. Accordingly, in the manufacturing method, the melting and fixation steps may be performed first and then, the press bonding step may be performed.

In the melting step, a laser irradiation device (not illustrated) is controlled to emit a laser beam LB (FIG. 4). In the melting step, the laser beam LB is emitted to the core-wire exposed part 13 and the core-wire connection body 40 from the free end 42a, 42a side of each piece part 42, 42, thereby melting the core-wire exposed part 13 and the core-wire connection body 40. The melting of the core-wire exposed part 13 and the core-wire connection body 40 starts at a part irradiated with the laser beam LB. In the melting step of the present embodiment, the laser beam LB is emitted to the core-wire exposed part 13 and the holding parts 43, 43 of the core-wire connection body 40, thereby melting the core-wire exposed part 13 and the holding parts 43, 43.

The laser beam LB may be emitted to, for example, each pair of the holding parts 43, 43 or between one pair of the holding parts 43, 43 and the other pair of the holding parts 43, 43 in the axis line direction (direction orthogonal to the protrusion direction and the opposite disposition direction of the piece parts 42, 42) of the core-wire exposed part 13. The laser beam LB is emitted at a width in the direction in which the piece parts 42, 42 are oppositely disposed, the width being larger than the core-wire diameter D1 of the temporarily held core-wire exposed part 13 and smaller than the interval S1 between the inner wall surfaces 42b, 42b of the free ends 42a, 42a of the piece parts 42, 42 (FIG. 4). Since the laser beam LB is emitted at such a narrow width, it is possible to prevent irradiation of any unnecessary place with the laser beam LB, and when the terminal fitting 20 is housed in the housing as described above, it is possible to prevent irradiation of the housing with the laser beam LB.

In the melting step, with the laser beam LB emitted to the inner space of the core-wire connection body 40, the core-wire exposed part 13 starts melting at a part irradiated with the laser beam LB, and each holding part 43, 43 starts melting on the end part 43a, 43a side. For example, in the melting step, the laser beam LB having an intensity with which at least the part irradiated with the laser beam LB in the core-wire exposed part 13 and the end part 43a, 43a side of each holding part 43, 43 can be melted is emitted. In the melting step, the intensity of the laser beam LB may be adjusted to melt the core-wire exposed part 13 up to the bottom part 41 side. In the melting step in this example, the opening 40a side of each holding part 43, 43 with respect to the bottom part 41 side and the core-wire exposed part 13 are melted through irradiation with the laser beam LB while the bottom part 41 side of each holding part 43, 43 is left unmelted (FIG. 4).

The manufacturing method proceeds to the fixation step after the melting step. In the fixation step, the laser irradiation device is controlled to stop the emission of the laser beam LB from the laser irradiation device. Specifically, in the fixation step, the irradiation with the laser beam LB is stopped to fix the core-wire exposed part 13 and the core-wire connection body 40 being melted by the laser beam LB. In the fixation step of the present embodiment, the core-wire exposed part 13 and each holding part 43, 43 being melted by the laser beam LB are fixed. Accordingly, in the fixation step, the core-wire exposed part 13 and the core-wire connection body 40 can be physically and electrically connected with each other.

Figure 5:
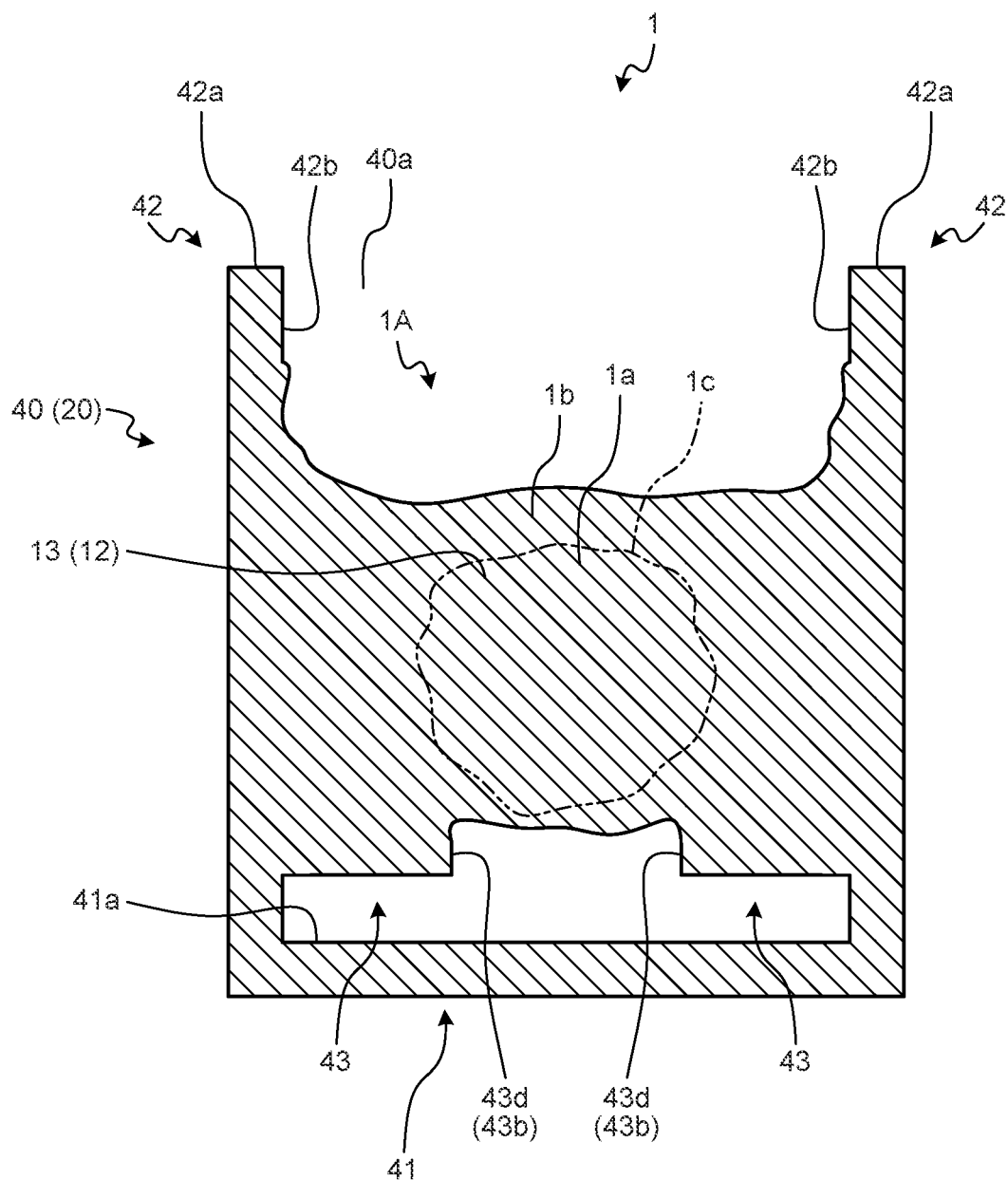
FIG. 5 is a cross-sectional view illustrating the core-wire exposed part and the core-wire connection body of the embodiment subjected to the fixation step.

In the fixation step in this example, the opening 40a side of each holding part 43, 43 with respect to the bottom part 41 side and the core-wire exposed part 13 are melted, and then the irradiation with the laser beam LB is stopped to fix melted parts of the opening 40a side of each holding part 43, 43 with respect to the bottom part 41 side and the core-wire exposed part 13 (FIG. 5). The core-wire exposed part 13 and the holding parts 43, 43 of the core-wire connection body 40 form a melted-fixed part 1A that is melted and then fixed through the melting step and the fixation step. The melted-fixed part 1A is substantially divided into a first fixation region 1a of the melted core-wire exposed part 13 and a second fixation region 1b of the melted holding parts 43, 43. In the melted-fixed part 1A in this example, the first fixation region 1a and the second fixation region 1b are fixed to each other in a boundary region therebetween. In other words, the core-wire connection body 40 includes the second fixation region 1b fixed to the first fixation region 1a of the melted core-wire exposed part 13 between the inner wall surfaces 42b, 42b of the piece parts 42, 42. The boundary region is impossible or difficult to visually recognize depending on a melting state in some cases, and thus is denoted by Reference sign 1c and illustrated with a dashed and double-dotted line for sake of illustration.

The press bonding step uses a press bonding machine (not illustrated) having a configuration well known in the present technical field. In the press bonding step, the cover connection body 50 in which the cover 11 at the terminal of the electric wire 10 is housed is sandwiched and pressurized between upper and lower molds of the press bonding machine so that the barrel piece parts 52, 52 are wrapped around the cover 11 at the terminal of the electric wire 10 in accordance with, for example, the shape of the upper mold.

As described above, in the terminal-equipped electric wire manufacturing method and the terminal-equipped electric wire 1 of the present embodiment, the laser beam LB is emitted to the inner space of the core-wire connection body 40 to weld the core-wire exposed part 13 and the holding parts 43, 43 in the space. Thus, in the terminal-equipped electric wire manufacturing method and the terminal-equipped electric wire 1, it is possible to irradiate a welding target with the laser beam LB of a desired intensity without thermally affecting a peripheral part such as the housing, thereby solidly welding the core-wire exposed part 13 and the holding parts 43, 43. Moreover, in the terminal-equipped electric wire manufacturing method and the terminal-equipped electric wire 1 of the present embodiment, the core-wire exposed part 13 and each holding part 43, 43 temporarily holding the core-wire exposed part 13 are welded in the inner space of the core-wire connection body 40, and thus it is easy to set the irradiation range of the laser beam LB and it is possible to achieve stable welding between the parts. As described above, in the terminal-equipped electric wire manufacturing method and the terminal-equipped electric wire 1 of the present embodiment, the core-wire exposed part 13 and the core-wire connection body 40 are connected with each other in a desirable and stable state, thereby making it possible to improve the quality of conduction between the electric wire 10 and the terminal fitting 20.

In addition, in the terminal-equipped electric wire manufacturing method and the terminal-equipped electric wire 1 of the present embodiment, the core-wire exposed part 13 is inserted between the inner wall surfaces 42b, 42b of the piece parts 42, 42 and temporarily held by the holding parts 43, 43. Thus, it is possible to improve productivity in the terminal-equipped electric wire manufacturing method and the terminal-equipped electric wire 1.

In addition, in the terminal-equipped electric wire manufacturing method and the terminal-equipped electric wire 1 of the present embodiment, the end faces 43d, 43d of the press fitting parts 43b, 43b are formed as press contact blades that cut the cover 11 and dig into the strands 12a of the core-wire exposed part 13 without cutting the strands 12a. Thus, in the terminal-equipped electric wire manufacturing method and the terminal-equipped electric wire 1, a terminal fitting including press contact blades can be used as the terminal fitting 20 of the present invention, and thus, for example, an existing terminal fitting equipped with press contact blades can be used as the terminal fitting 20 of the present invention. Accordingly, in the terminal-equipped electric wire manufacturing method and the terminal-equipped electric wire 1, cost reduction can be achieved.

In addition, since an existing housing can be used as the above-described housing, cost reduction can be achieved for this reason as well.

First Modification

Figure 6:
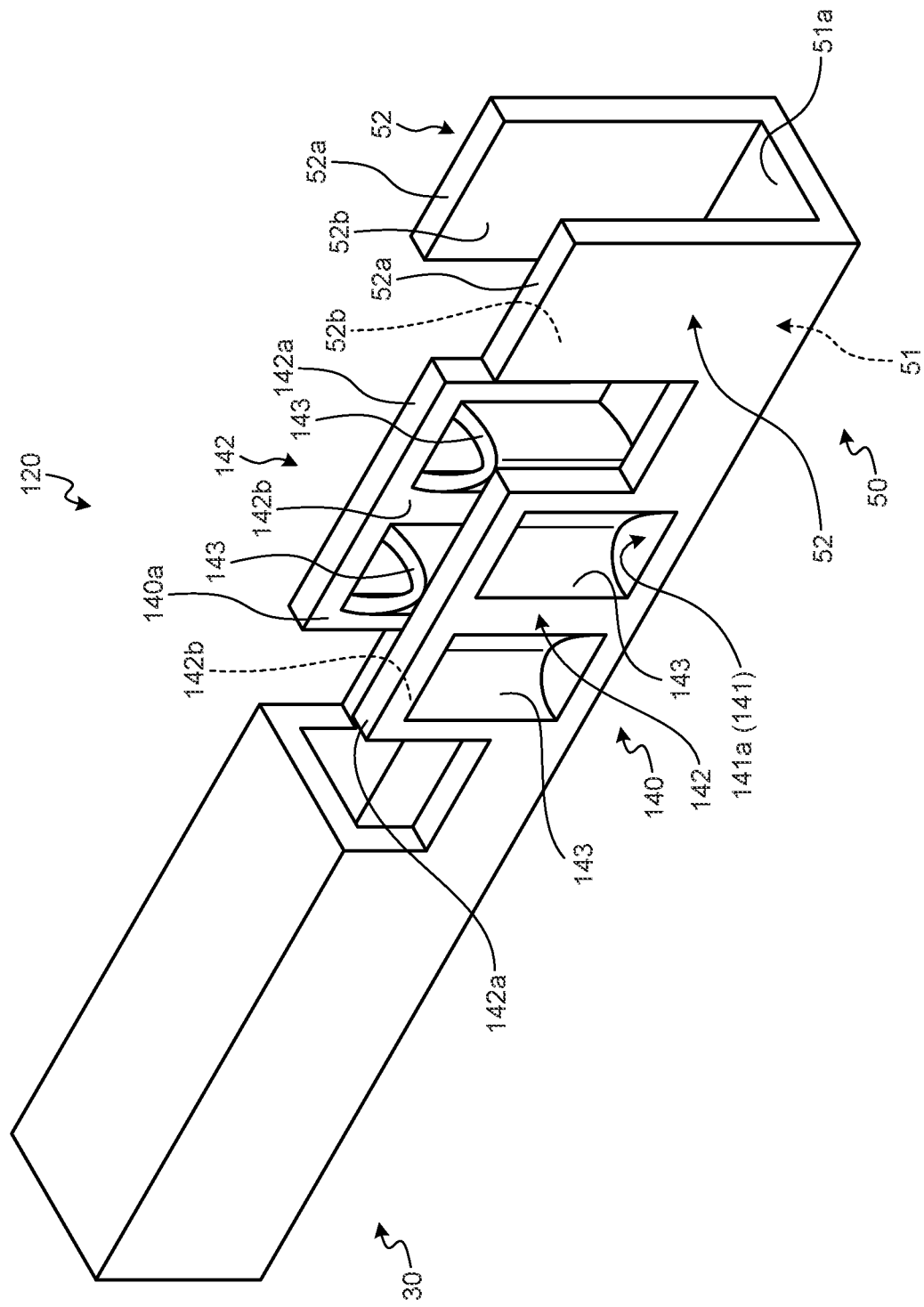
FIG. 6 is a perspective view illustrating a terminal fitting of a first modification.
Figure 7:
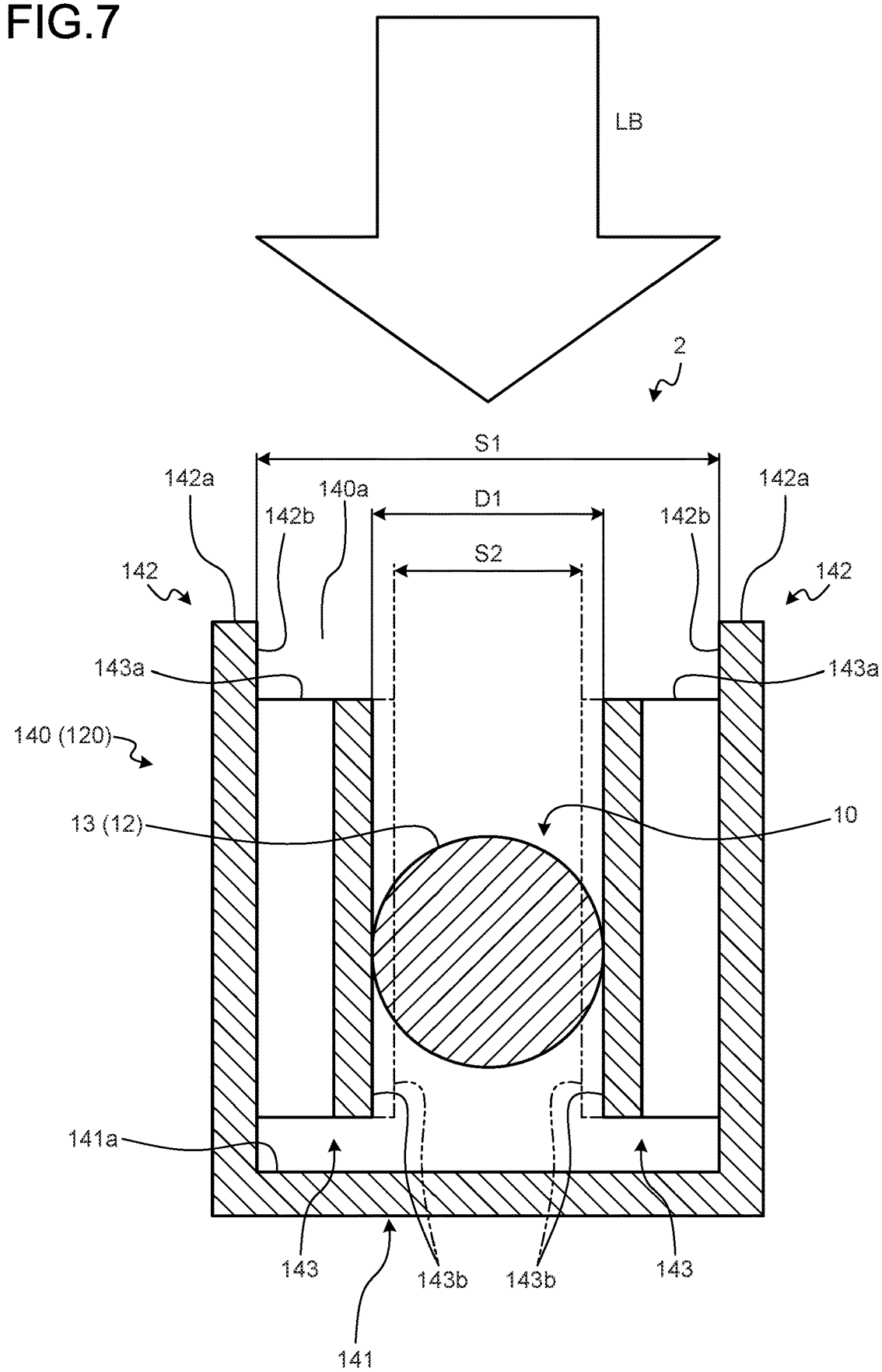
FIG. 7 is a cross-sectional view illustrating the core-wire exposed part and a core-wire connection body of the first modification before being melted in the melting step.

A terminal-equipped electric wire manufacturing method of the present modification manufactures a terminal-equipped electric wire 2 in which a terminal fitting 120 to be described later is attached to the terminal of the electric wire 10 (FIGS. 6 and 7).

The terminal fitting 120 of the present modification corresponds to, for example, the terminal fitting 20 of the above-described embodiment in which at least the core-wire connection body 40 is replaced with a core-wire connection body 140 to be described later (FIGS. 6 and 7). The core-wire connection body 140 corresponds to the core-wire connection body 40 of the embodiment that includes a bottom part 141 and a pair of piece parts 142, 142 similar to the bottom part 41 of the core-wire connection body 40 of the embodiment and the pair of piece parts 42, 42, respectively, and in which the holding parts 43, 43 of the core-wire connection body 40 of the embodiment are replaced with holding parts 143, 143 described later.

Similarly to the holding parts 43, 43 of the embodiment, the holding parts 143, 143 temporarily hold, between inner wall surfaces 142b, 142b of the respective piece parts 142, 142, the core-wire exposed part 13 housed in the inner space. The holding parts 143, 143 protrude from the inner wall surface 142b, 142b sides of the piece parts 142, 142 and are oppositely disposed in the opposite disposition direction of the piece parts 142, 142 (FIGS. 6 and 7). However, the holding parts 143, 143 of the present modification are formed to be elastically deformable in the opposite disposition direction and sandwich the core-wire exposed part 13 in the opposite disposition direction by using reaction force due to the elastic deformation so that the core-wire exposed part 13 is temporarily held between the inner wall surfaces 142b, 142b of the piece parts 142, 142. Similarly to the holding parts 43, 43 of the embodiment, the holding parts 143, 143 include end parts 143a, 143a, respectively, on an opening 140a side of free end 142a, 142a sides of the respective piece parts 142, 142 and on the laser beam irradiation side, and sandwich the core-wire exposed part 13 on the bottom part 141 side of the end parts 143a, 143a (FIG. 7).

Specifically, the holding parts 143, 143 of the present modification include elastic deformation parts 143b, 143b that are end parts in their protrusion direction, oppositely disposed in their opposite disposition direction at the interval S2 smaller than the core-wire diameter D1 of the core wire 12 (core-wire exposed part 13), and elastically deform by receiving force from the core-wire exposed part 13 inserted into the gap of the interval S2 (FIG. 7).

Each holding part 143, 143 in this example has a convex shape protruding from the inner wall surface 142b, 142b side of the corresponding piece part 142, 142 and extending in the protrusion direction of the piece part 142, 142. Each holding part 143, 143 in this example is formed in a chevron shape by providing cuts extending in the axis line direction of the core-wire exposed part 13 on the opening 140a side and the bottom part 141 side of the corresponding piece part 142, 142 and by deforming a piece body surrounded by the cuts toward the inside of the core-wire connection body 140 by press shaping or the like.

The core-wire connection body 140 includes at least one pair of the holding parts 143, 143. In this example, two pairs of the holding parts 143, 143 are provided at an interval in the axis line direction of the core-wire exposed part 13.

In the electric wire installation step of the present modification, the core-wire exposed part 13 is inserted through the opening 140a between the piece parts 142, 142 and then inserted between the holding parts 143, 143. Accordingly, in the electric wire installation step, the holding parts 143, 143 receive force from the core-wire exposed part 13, elastically deform toward the respective piece part 142, 142 sides in the opposite disposition direction, and the holding parts 143, 143 apply reaction force due to the elastic deformation to the core-wire exposed part 13, thereby temporarily holding the core-wire exposed part 13 sandwiched between the holding parts 143, 143.

In the present modification as well, the melting and fixation steps are performed similarly to the melting and fixation steps of the embodiment. Thus, similarly to the terminal-equipped electric wire manufacturing method and the terminal-equipped electric wire 1 of the embodiment, the terminal-equipped electric wire manufacturing method and the terminal-equipped electric wire 2 of the present modification can improve the quality of conduction between the electric wire 10 and the terminal fitting 120. Moreover, in the terminal-equipped electric wire manufacturing method and the terminal-equipped electric wire 2 of the present modification, similarly to the terminal-equipped electric wire manufacturing method and the terminal-equipped electric wire 1 of the embodiment, the core-wire exposed part 13 is inserted between the inner wall surfaces 142b, 142b of the piece parts 142, 142 and temporarily held between the holding parts 143, 143, and thus it is possible to improve productivity.

Second Modification

Figure 8:
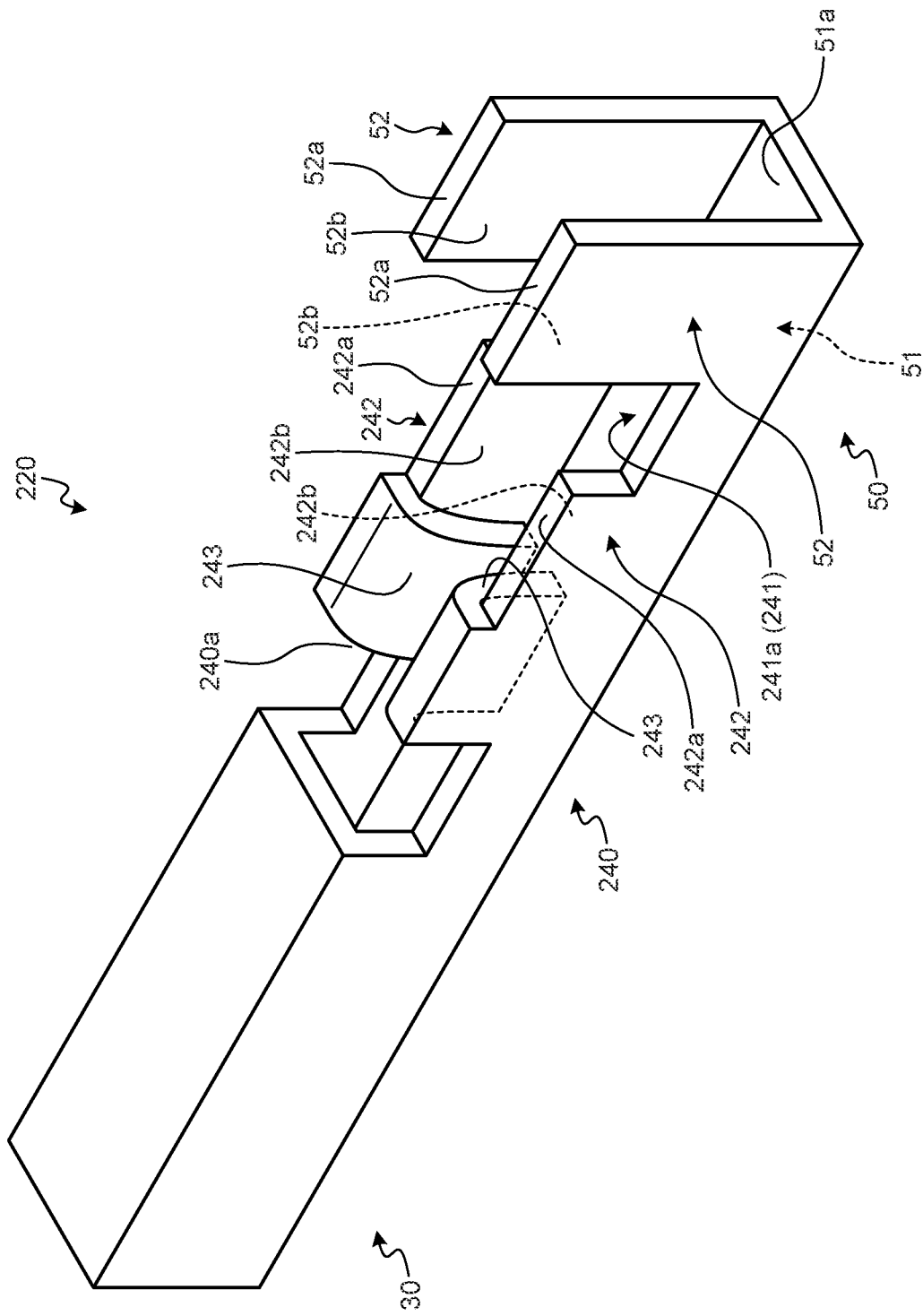
FIG. 8 is a perspective view illustrating a terminal fitting of a second modification.
Figure 9:
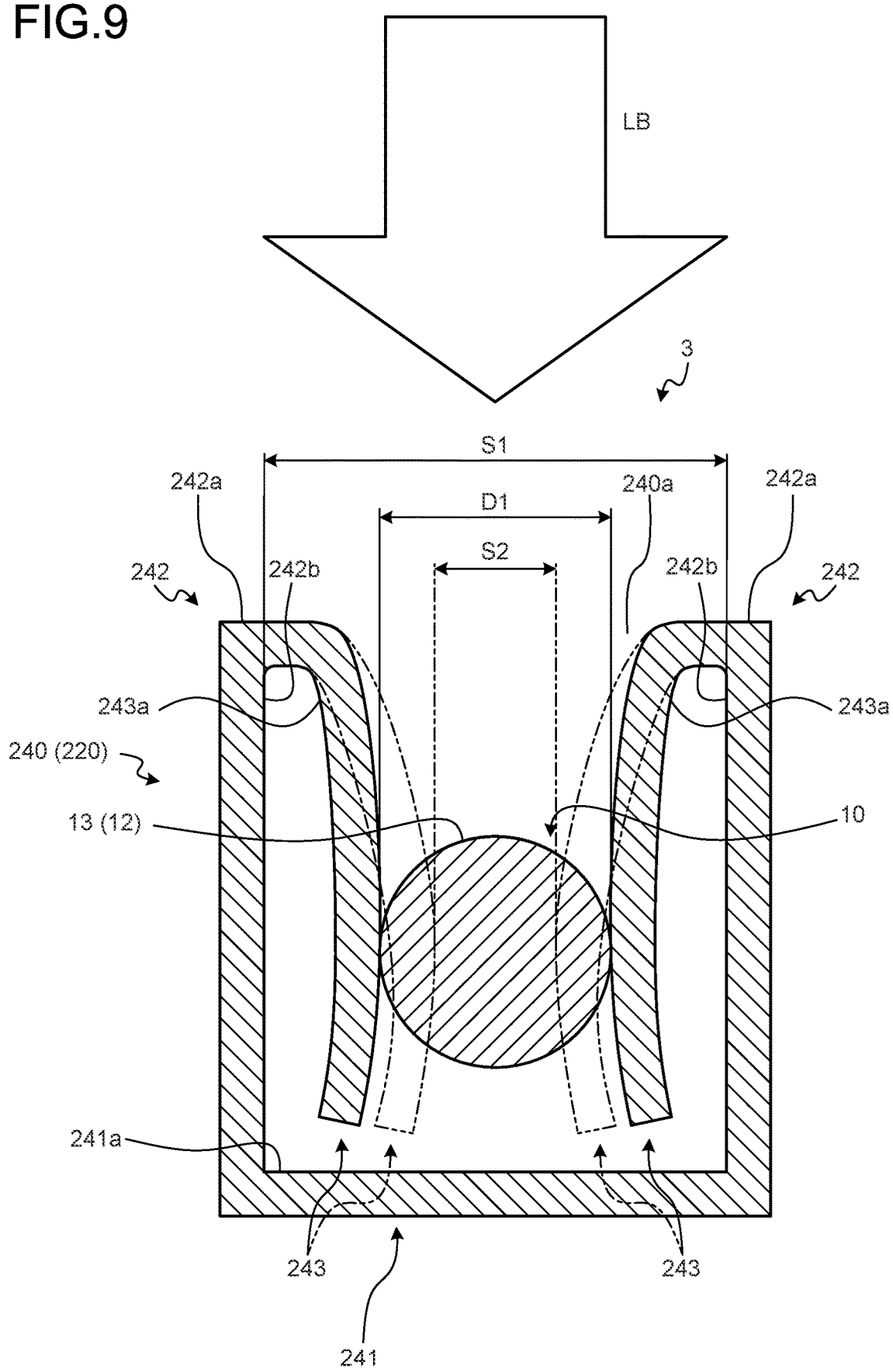
FIG. 9 is a cross-sectional view illustrating the core-wire exposed part and a core-wire connection body of the second modification before being melted in the melting step.

A terminal-equipped electric wire manufacturing method of the present modification manufactures a terminal-equipped electric wire 3 in which a terminal fitting 220 to be described later is attached to the terminal of the electric wire 10 (FIGS. 8 and 9).

The terminal fitting 220 of the present modification corresponds to, for example, the terminal fitting 120 of the first modification described above in which at least the core-wire connection body 140 is replaced with a core-wire connection body 240 to be described later (FIGS. 8 and 9). The core-wire connection body 240 corresponds to the core-wire connection body 140 of the first modification that includes a bottom part 241 and a pair of piece parts 242, 242 similar to the bottom part 141 and the pair of piece parts 142, 142, respectively, in the core-wire connection body 140 of the first modification and in which the holding parts 143, 143 are replaced with holding parts 243, 243 described later.

Similarly to the holding parts 143, 143 of the first modification, the holding parts 243, 243 temporarily hold the core-wire exposed part 13 housed in the inner space between inner wall surfaces 242b, 242b of the respective piece parts 242, 242. The holding parts 243, 243 protrude from the inner wall surface 242b, 242b sides of the piece parts 242, 242 and are oppositely disposed in the opposite disposition direction of the piece parts 242, 242 (FIGS. 8 and 9). Similarly to the holding parts 143, 143 of the first modification, the holding parts 243, 243 of the present modification are formed to be elastically deformable in the opposite disposition direction and sandwich the core-wire exposed part 13 between in the opposite disposition direction by using reaction force due to the elastic deformation so that the core-wire exposed part 13 is temporarily held between the inner wall surfaces 242b, 242b of the piece parts 242, 242. Similarly to the holding parts 143, 143 of the first modification, the holding parts 243, 243 include end parts 243a, 243a respectively, on an opening 240a side of free end 242a, 242a sides of the piece parts 242, 242 and on the laser beam irradiation side, and sandwich the core-wire exposed part 13 on the bottom part 241 side of the end parts 243a, 243a (FIG. 9).

Specifically, the holding parts 243, 243 of the present modification are formed in cantilever arc piece body shapes curved toward the bottom part 241 side from the free ends 242a, 242a of the piece parts 242, 242 (FIGS. 8 and 9). The minimum surface distance between the holding parts 243, 243 in the opposite disposition direction thereof is set to be the interval S2 smaller than the core-wire diameter D1 of the core wire 12 (core-wire exposed part 13). The holding parts 243, 243 receive force from the core-wire exposed part 13 inserted in the gap of the interval S2 and elastically deform toward the piece part 242, 242 sides (FIG. 9).

The core-wire connection body 240 include at least one pair of the holding parts 243, 243. In this example, one pair of the holding parts 243, 243 are provided.

In the electric wire installation step of the present modification, the core-wire exposed part 13 is inserted through the opening 240a between the piece parts 242, 242 and then inserted between the holding parts 243, 243. Accordingly, in the electric wire installation step, the holding parts 243, 243 receive force from the core-wire exposed part 13, elastically deform toward the piece part 242, 242 sides in the opposite disposition direction, and the holding parts 243, 243 apply reaction force due to the elastic deformation to the core-wire exposed part 13, thereby temporarily holding the core-wire exposed part 13 sandwiched between the holding parts 243, 243.

In the present modification as well, the melting and fixation steps are performed similarly to the melting and fixation steps in the embodiment and the first modification. However, the laser beam LB in the melting step is emitted across the entire holding parts 243, 243 of the piece body shapes in the axis line direction (axis line direction of the core-wire exposed part 13). Accordingly, similarly to the terminal-equipped electric wire manufacturing method and the terminal-equipped electric wires 1 and 2 of the embodiment and the first modification, with the terminal-equipped electric wire manufacturing method and the terminal-equipped electric wire 3 of the present modification, it is possible to improve the quality of conduction between the electric wire 10 and the terminal fitting 220. Moreover, similarly to the terminal-equipped electric wire manufacturing method and the terminal-equipped electric wires 1 and 2 of the embodiment and the first modification, in the terminal-equipped electric wire manufacturing method and the terminal-equipped electric wire 3 of the present modification, the core-wire exposed part 13 is inserted between the inner wall surfaces 242b, 242b of the piece parts 242, 242 and temporarily held between the holding parts 243, 243, and thus it is possible to improve productivity.

Third Modification

A terminal-equipped electric wire manufacturing method of the present modification manufactures a terminal-equipped electric wire 4 in which a terminal fitting 320 to be described later is attached to the terminal of the electric wire 10 (FIGS. 10 to 15).

Figure 10:
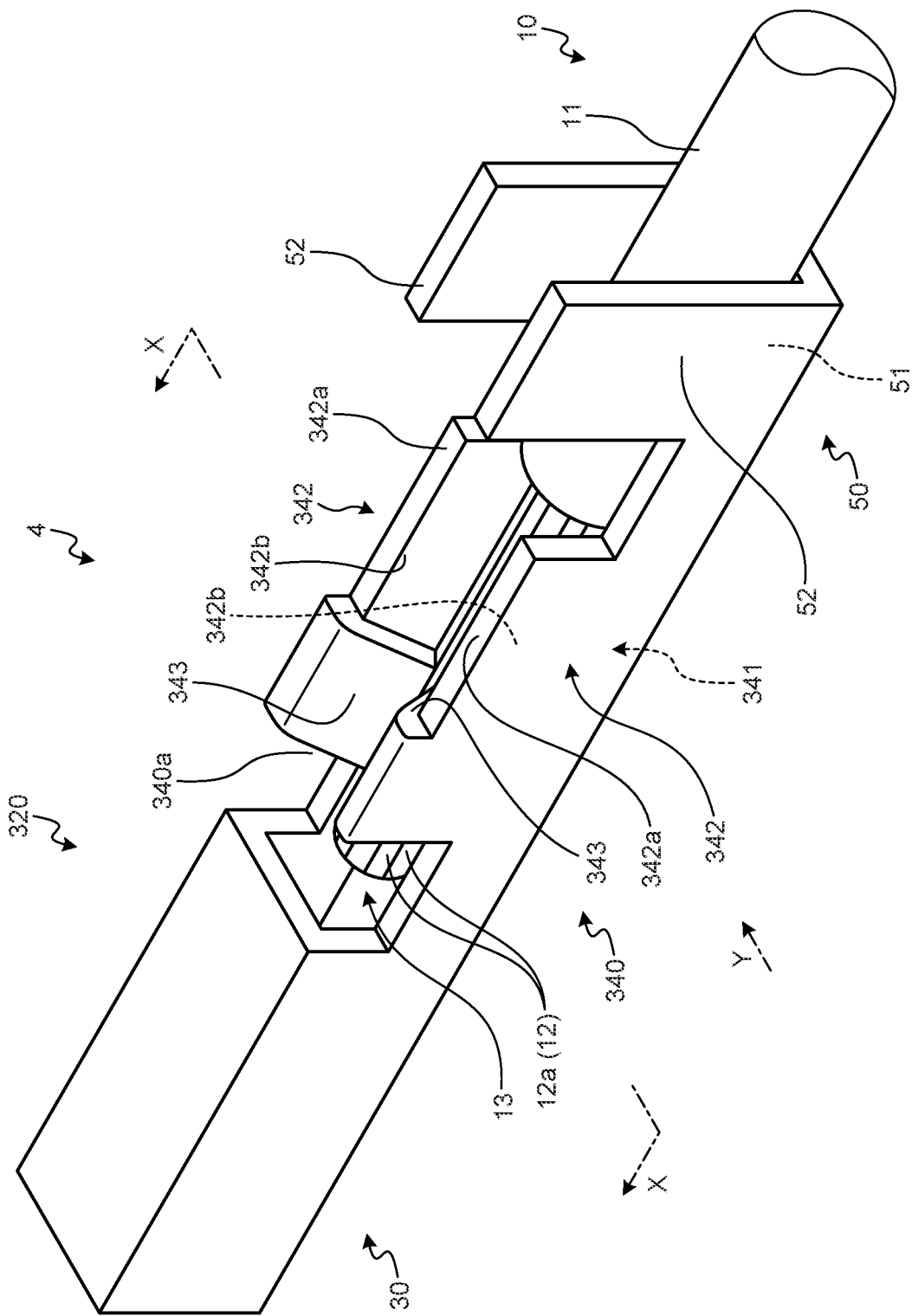
FIG. 10 is a perspective view illustrating a terminal-equipped electric wire of a third modification in a state before being subjected to the melting step, the fixation step, and the press bonding step.
Figure 11:
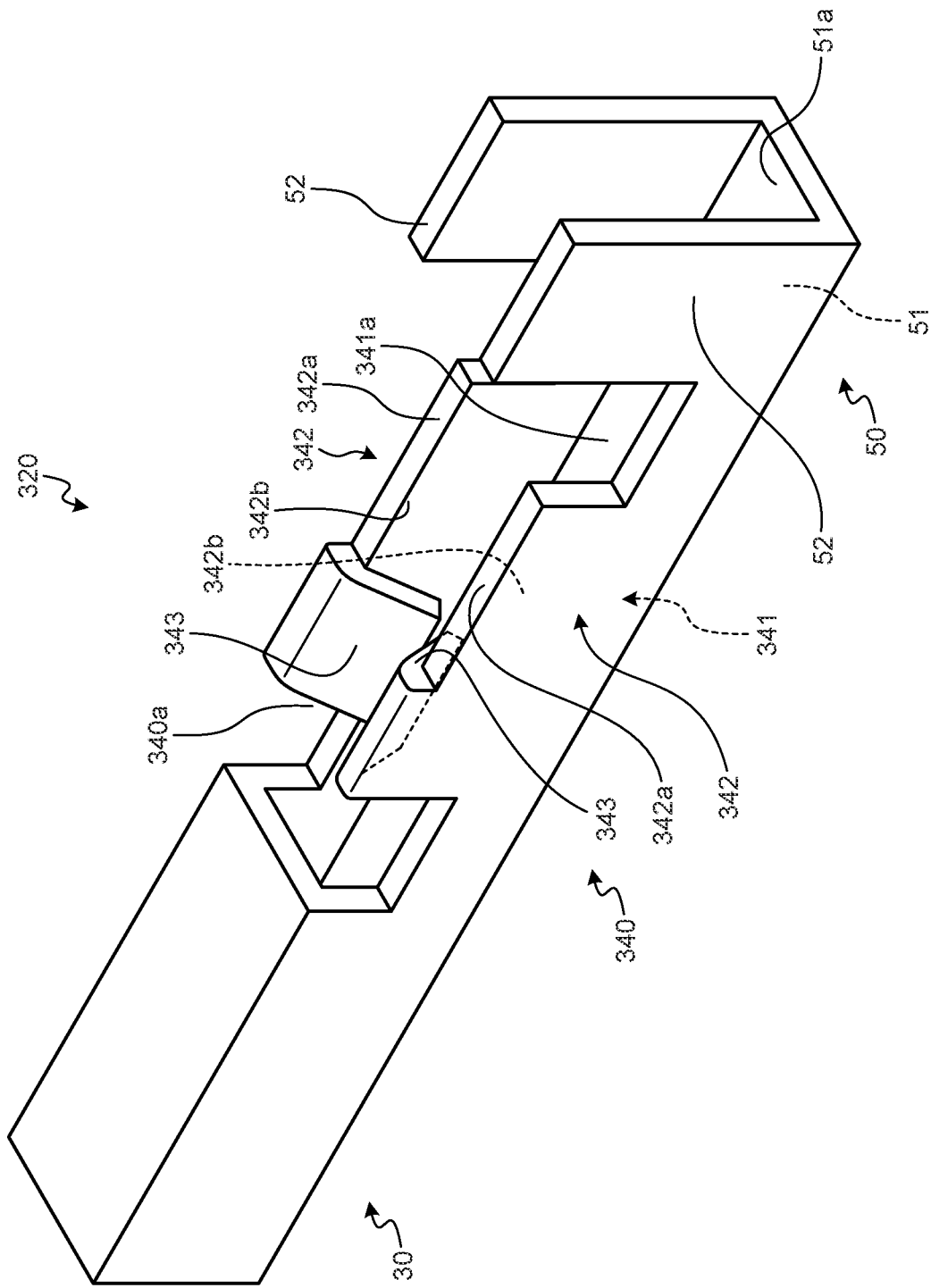
FIG. 11 is a perspective view illustrating a terminal fitting of the third modification.

The terminal fitting 320 of the present modification corresponds to, for example, the terminal fitting 20 of the above-described embodiment in which at least the core-wire connection body 40 is replaced with a core-wire connection body 340 to be described later (FIGS. 10 and 11). The core-wire connection body 340 corresponds to the core-wire connection body 40 of the embodiment that includes a bottom part 341 and a pair of piece parts 342, 342 similar to the bottom part 41 and the pair of piece parts 42, 42 in the core-wire connection body 40 of the embodiment and in which the holding parts 43, 43 are replaced with holding parts 343, 343 described later.

Figure 12:
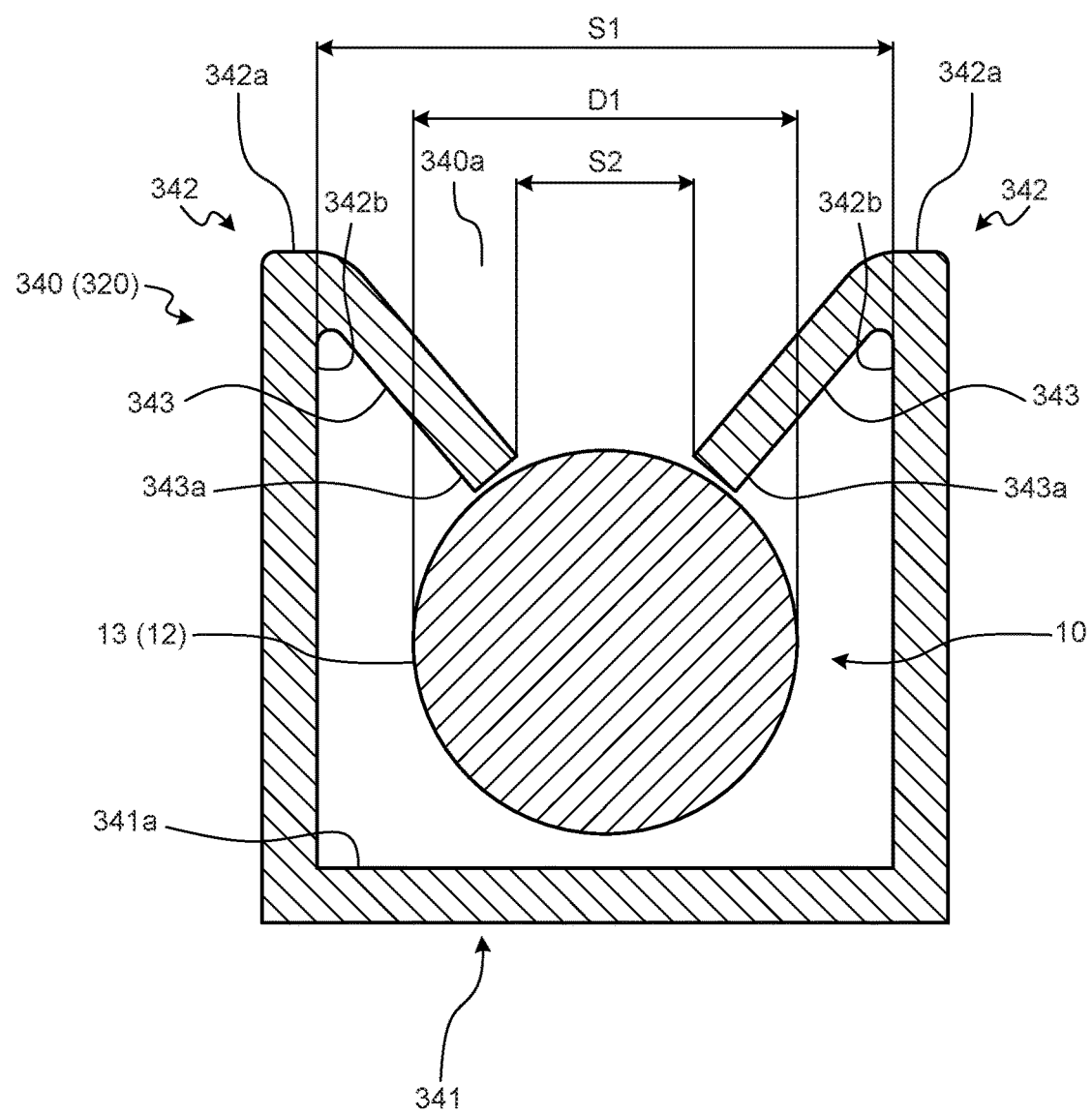
FIG. 12 is a cross-sectional view taken along line X-X in FIG. 10, illustrating the core-wire exposed part and a core-wire connection body of the third modification in the melting step.
Figure 13:
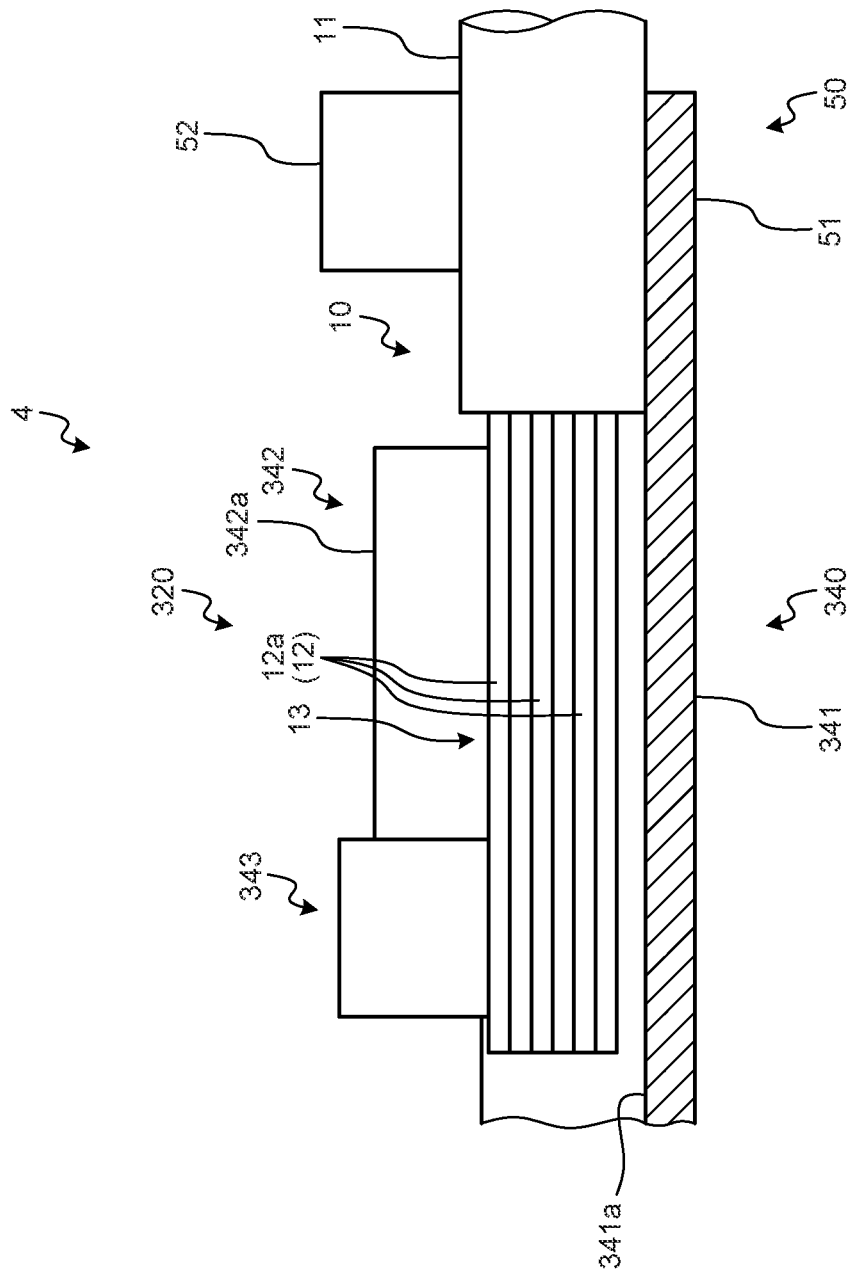
FIG. 13 is a diagram of the inside of the core-wire connection body of the third modification before being subjected to the melting step and the fixation step when viewed in the direction of arrow Y in FIG. 10.

Similarly to the holding parts 43, 43 of the embodiment, the holding parts 343, 343 temporarily hold the core-wire exposed part 13 housed in the inner space between inner wall surfaces 342b, 342b of the piece parts 342, 342. The holding parts 343, 343 protrude from the inner wall surface 342b, 342b sides of the piece parts 342, 342 and are oppositely disposed in the opposite disposition direction of the piece parts 342, 342 (FIG. 12). Similarly to the holding parts 43, 43 of the embodiment, the holding parts 343, 343 sandwich the core-wire exposed part 13 on an opening 340a side of free end 342a, 342a sides of the respective piece parts 342, 342 and on the bottom part 341 side compared to end parts on the laser beam irradiation side. However, the holding parts 343, 343 of the present modification are disposed opposite to an inner wall surface (bottom surface) 341a of the bottom part 341 to sandwich the core-wire exposed part 13 between each holding part 343, 343 and the bottom part 341 so that the core-wire exposed part 13 is temporarily held between the inner wall surfaces 342b, 342b of the piece parts 342, 342. Accordingly, in the core-wire connection body 340 of the present modification, the core-wire exposed part 13 is sandwiched between each holding part 343, 343 and the bottom part 341 on the bottom part 341 side of the holding parts 343, 343.

Specifically, each holding part 343, 343 of the present modification is formed in a piece body shape protruding toward the bottom part 341 side of the free ends 342a, 342a of the piece parts 342, 342 and the oppositely disposed counterpart holding part 343 side (FIGS. 10 to 13). The holding parts 343, 343 sandwich the core-wire exposed part 13 between each free end 343a, 343a and the bottom part 341 (FIG. 12). Thus, the minimum interval S2 between the holding parts 343, 343 in the opposite disposition direction of the free ends 343a, 343a is set to be smaller than the core-wire diameter D1 of the core wire 12 (core-wire exposed part 13).

In the electric wire installation step of the present modification, the core-wire exposed part 13 is inserted through the opening 340a between the piece parts 342, 342, but it is difficult to insert the core-wire exposed part 13 between the free ends 343a, 343a of the holding parts 343, 343. Thus, in the electric wire installation step of the present modification, the core-wire exposed part 13 is inserted, from its leading end, in the axis line direction between the free end 343a, 343a of each holding part 343, 343 and the bottom part 341. In the electric wire installation step, the core-wire exposed part 13 is sandwiched and temporarily held between the free end 343a, 343a of each holding part 343, 343 and the bottom part 341 in this manner. The core-wire connection body 340 includes one pair of the holding parts 343, 343 because of such an insertion form of the core-wire exposed part 13.

In the melting step of the present modification, the laser beam LB is emitted to the core-wire exposed part 13 and the holding parts 343, 343 of the core-wire connection body 340, thereby melting the core-wire exposed part 13 and the holding parts 343, 343. Similarly to the melting step of the embodiment, the laser beam LB is emitted at a width in the opposite disposition direction of the piece parts 342, 342, the width being larger than the core-wire diameter D1 of the temporarily held core-wire exposed part 13 and smaller than the interval S1 between the inner wall surfaces 342b, 342b of the free ends 342a, 342a of the piece parts 342, 342 (FIG. 12). The laser beam LB is also emitted across the entire holding parts 343, 343 of the piece body shapes in the axis line direction (axis line direction of the core-wire exposed part 13).

In the melting step of the present modification, when the holding parts 343, 343 are melted, the entire or part of the melted free end 343a, 343a sides are placed on the core-wire exposed part 13 having started melting. In the melting step, irradiation with the laser beam LB is continued to melt the holding parts 343, 343 and the core-wire exposed part 13. For example, in the melting step, the intensity of the laser beam LB may be adjusted to melt the core-wire exposed part 13 up to the bottom part 341 side.

Figure 14:
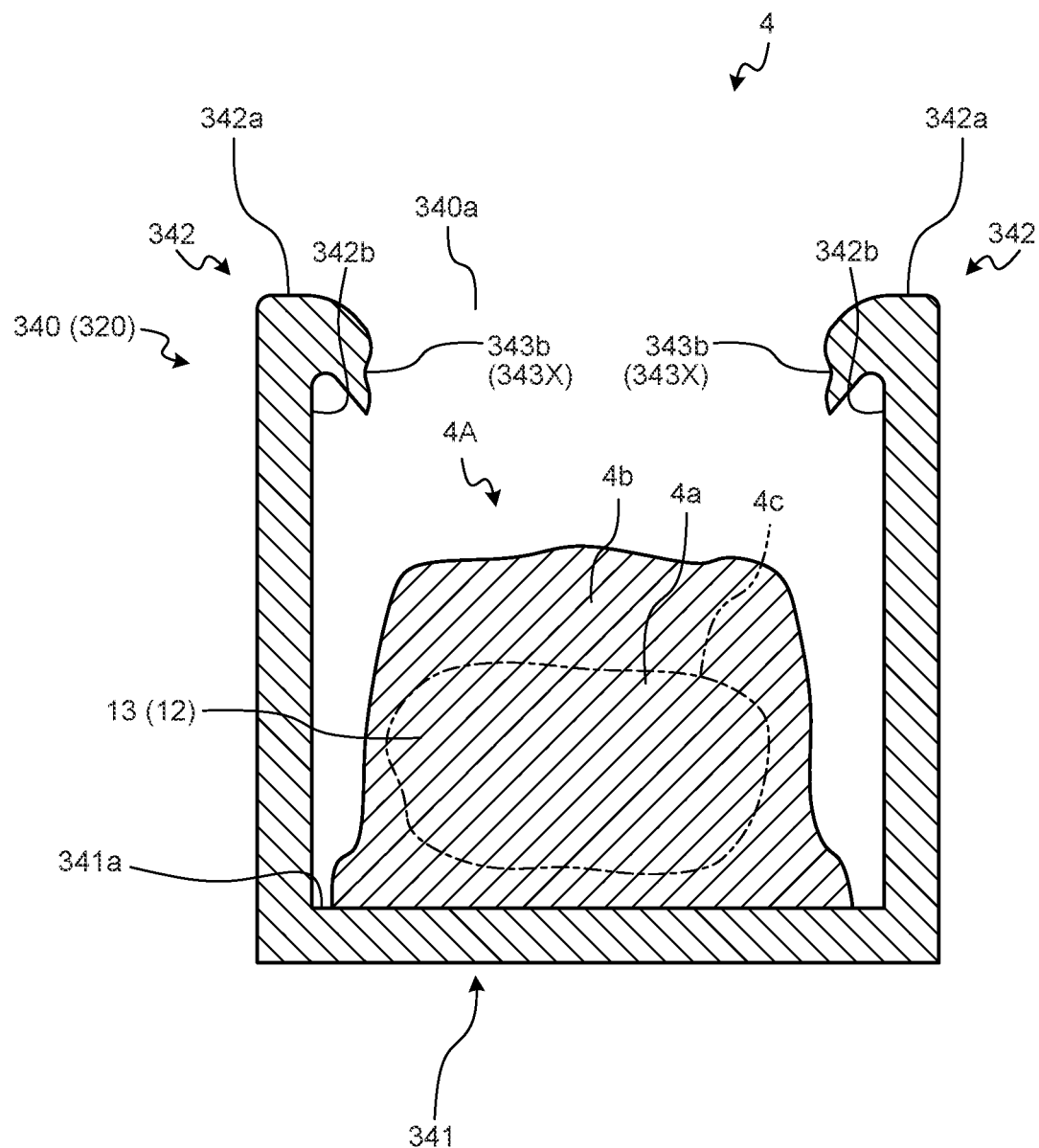
FIG. 14 is a cross-sectional view illustrating the core-wire exposed part and the core-wire connection body of the third modification subjected to the fixation step.
Figure 15:
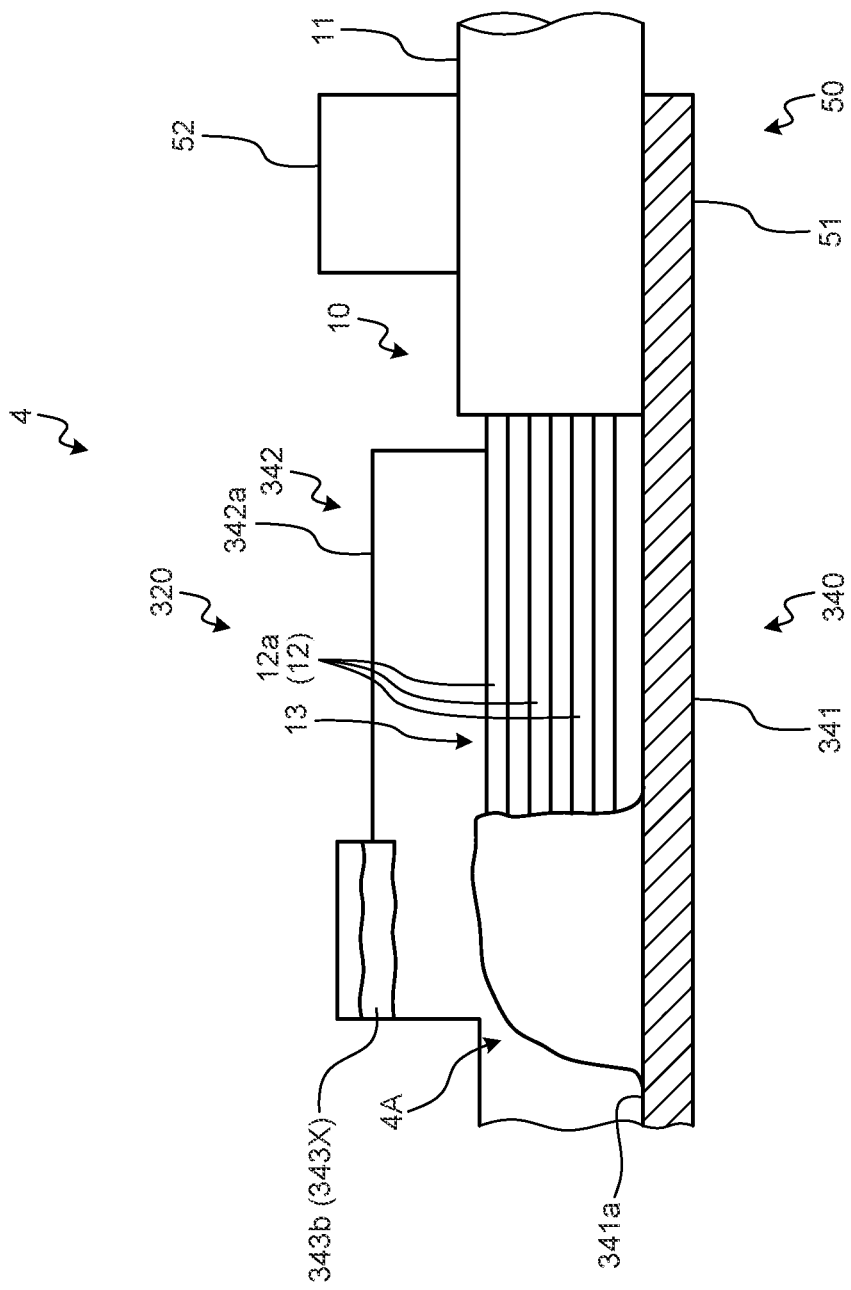
FIG. 15 is a diagram illustrating the inside of the core-wire connection body of the third modification subjected to the fixation step.

In the fixation step in this example, after the core-wire exposed part 13 is melted up to the bottom part 341 side, irradiation with the laser beam LB is stopped to fix melted parts of the holding parts 343, 343 and the core-wire exposed part 13 (FIGS. 14 and 15). The core-wire exposed part 13 and the holding parts 343, 343 of the core-wire connection body 340 form a melted-fixed part 4A that is melted and then fixed through the melting and fixation steps. In the melted-fixed part 4A, any component made of a metallic material same as that of the core-wire connection body 340 and the core-wire exposed part 13 are fixed after being melted. The melted-fixed part 4A is formed inside of the core-wire connection body 340. The melted-fixed part 4A is substantially divided into a first fixation region 4a of the melted core-wire exposed part 13 and a second fixation region 4b of the melted holding parts 343, 343, which contains a metallic material same as that of the core-wire connection body 340. In the melted-fixed part 4A in this example, the first fixation region 4a and the second fixation region 4b are fixed to each other in a boundary region therebetween. In other words, the core-wire connection body 340 includes the second fixation region 4b fixed to the first fixation region 4a of the melted core-wire exposed part 13 between the inner wall surfaces 342b, 342b of the piece parts 342, 342. The boundary region is impossible or difficult to visually recognize depending on a melting state in some cases, and thus is denoted by Reference sign 4c and illustrated with a dashed and double-dotted line for sake of illustration.

The core-wire connection body 340 subjected to the fixation step includes protrusion parts 343X protruding from the inner wall surface 342b, 342b sides of the piece parts 342, 342 (FIGS. 14 and 15). Each protrusion part 343X is part of the corresponding holding part 343 that is left unmelted through the melting step, and includes a solidified surface 343b that is melted and then solidified.

Similarly to the terminal-equipped electric wire manufacturing method and the terminal-equipped electric wires 1 to 3 of the embodiment and the first and the second modifications, with the terminal-equipped electric wire manufacturing method and the terminal-equipped electric wire 4 of the present modification, it is possible to improve the quality of conduction between the electric wire 10 and the terminal fitting 320. In the terminal-equipped electric wire manufacturing method and the terminal-equipped electric wire 4 of the present modification, some melted parts of the holding parts 343, 343 cover the core-wire exposed part 13 through the melting step, and thus the core-wire exposed part 13 can be prevented from being continuously directly irradiated with the laser beam LB. For example, at the core-wire exposed part 13, the strands 12a are potentially unraveled or melted due to continuous direct irradiation with the laser beam LB. In the terminal-equipped electric wire manufacturing method and the terminal-equipped electric wire 4 of the present modification, since some melted parts of the holding parts 343, 343 cover the core-wire exposed part 13 through the melting step, such unraveling and melting of the strands 12a can be prevented. In the terminal-equipped electric wire manufacturing method and the terminal-equipped electric wire 1, for this reason as well, the core-wire exposed part 13 and the core-wire connection body 340 are connected with each other in a desirable and stable state, thereby making it possible to improve the quality of conduction between the electric wire 10 and the terminal fitting 320.

In addition, Similarly to the terminal-equipped electric wire manufacturing method and the terminal-equipped electric wires 1 to 3 of the embodiment and the first and the second modifications, in the terminal-equipped electric wire manufacturing method and the terminal-equipped electric wire 4 of the present modification, the core-wire exposed part 13 is inserted between the inner wall surfaces 342b, 342b of the piece parts 342, 342 and temporarily held between the holding parts 343, 343, and thus it is possible to improve productivity.

Fourth Modification

Figure 16:
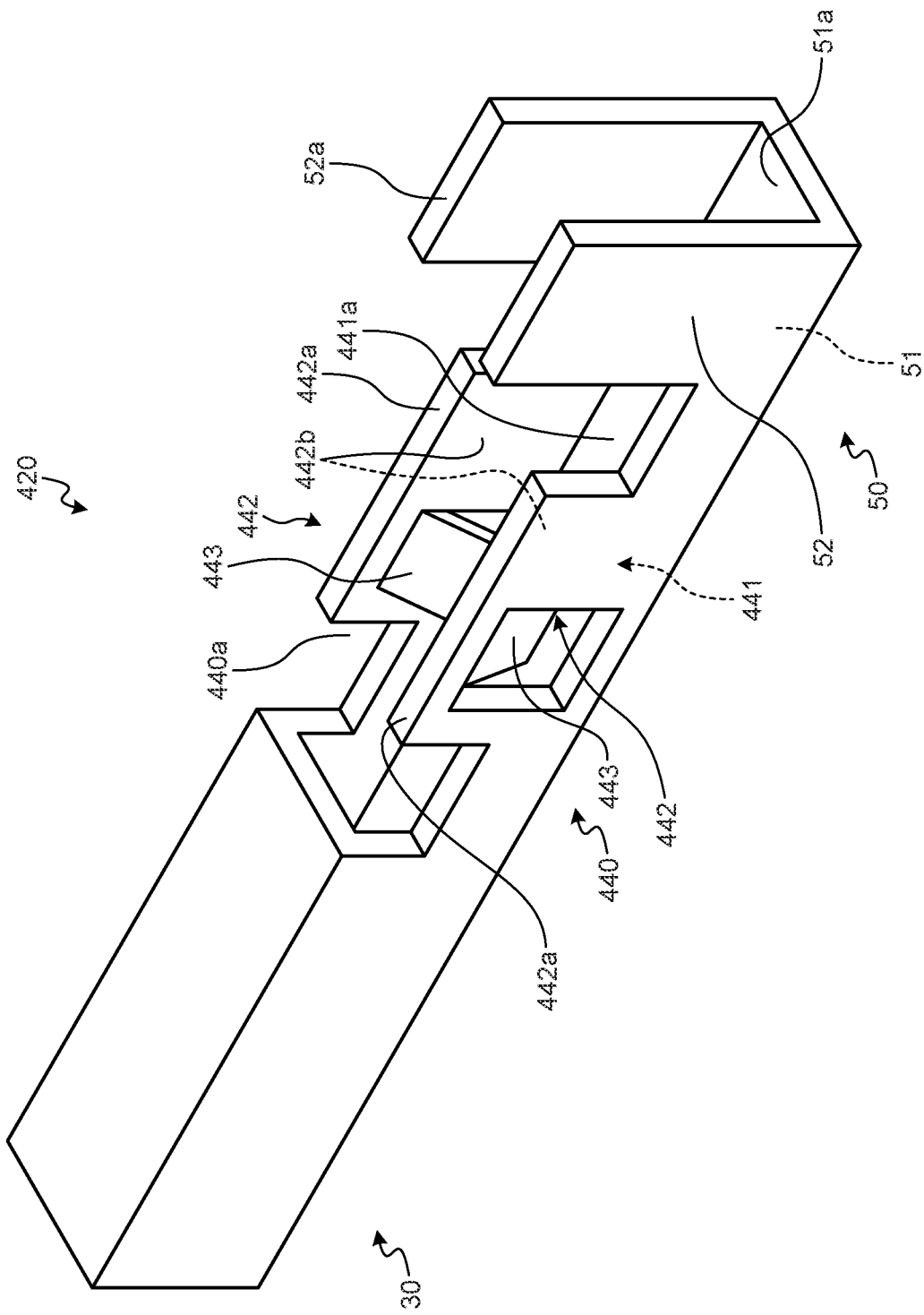
FIG. 16 is a perspective view illustrating a terminal fitting of a fourth modification.
Figure 17:
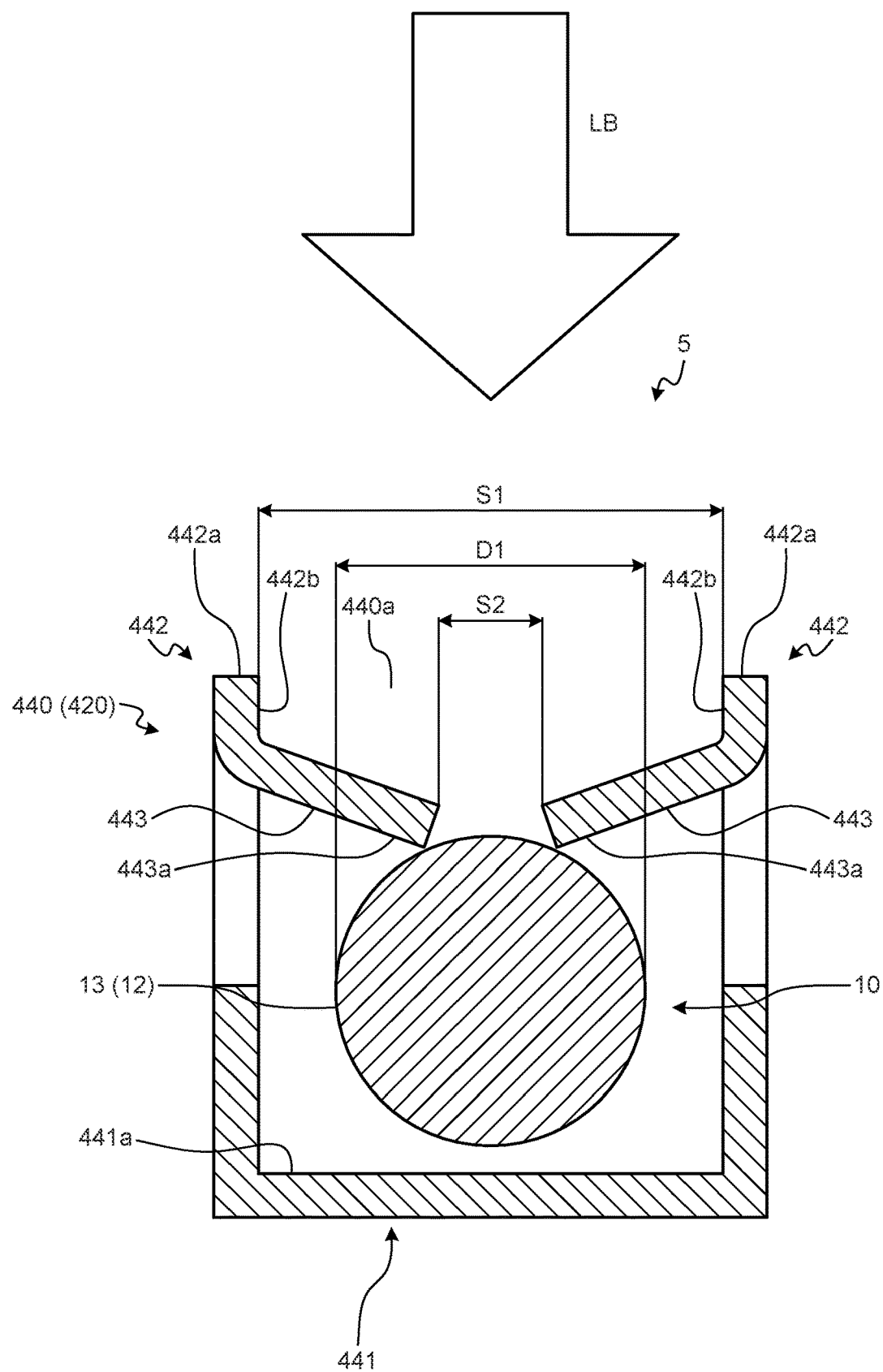
FIG. 17 is a cross-sectional view illustrating the core-wire exposed part and a core-wire connection body of the fourth modification before being melted in the melting step.
Figure 18:
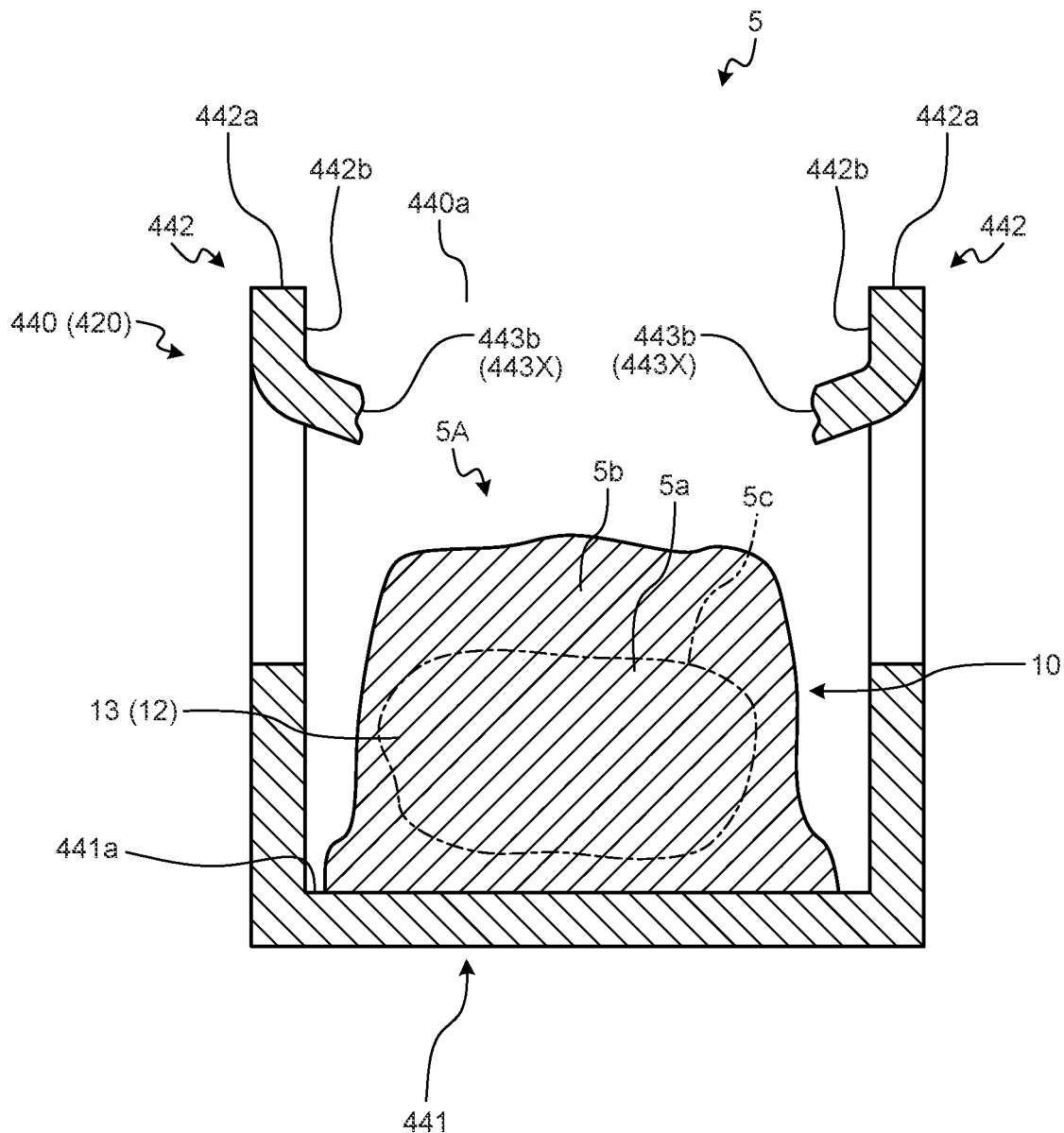
FIG. 18 is a cross-sectional view illustrating the core-wire exposed part and the core-wire connection body of the fourth modification subjected to the fixation step.
Figure 19:
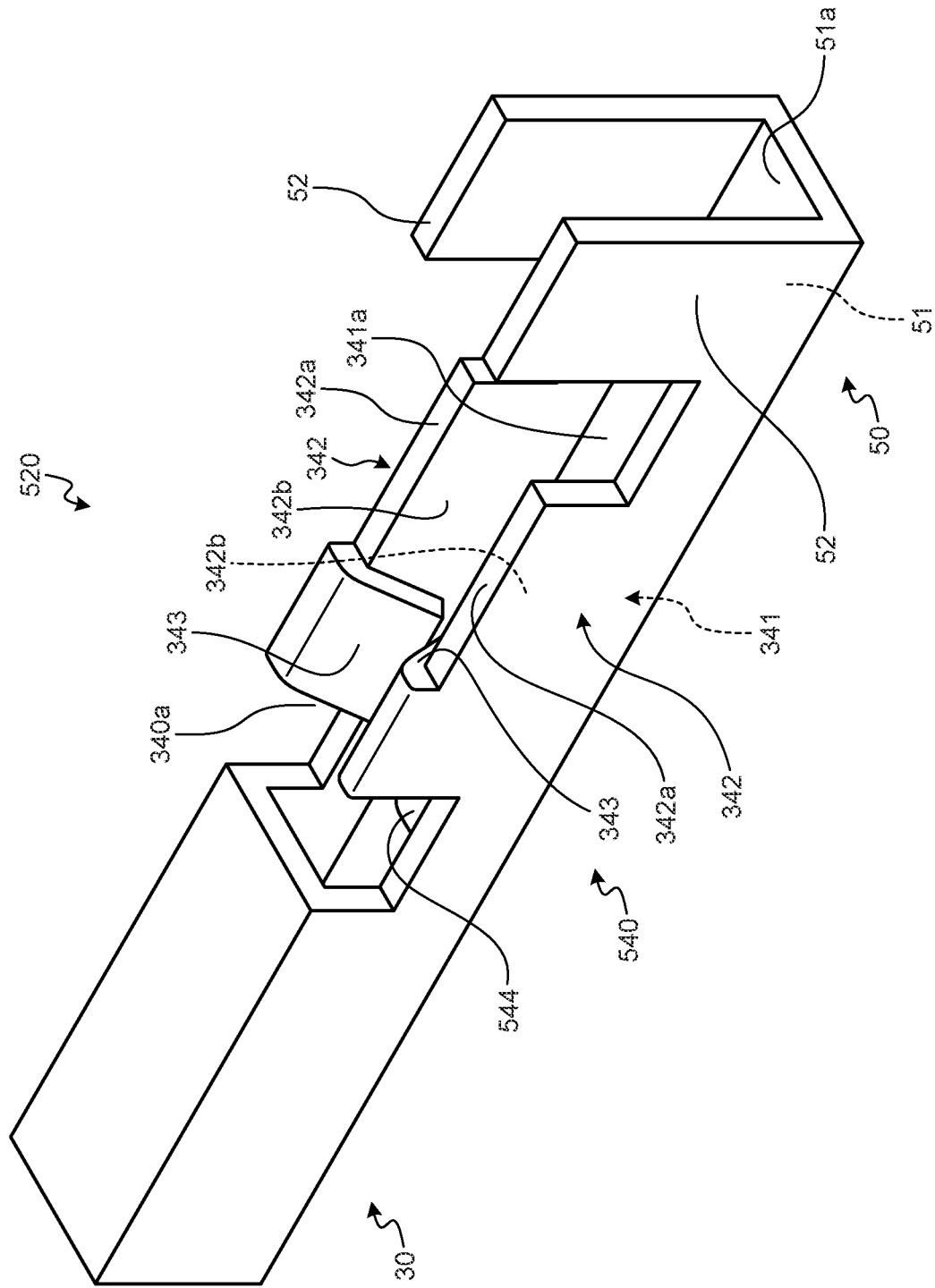
FIG. 19 is a perspective view illustrating a terminal fitting of a fifth modification.
Figure 20:
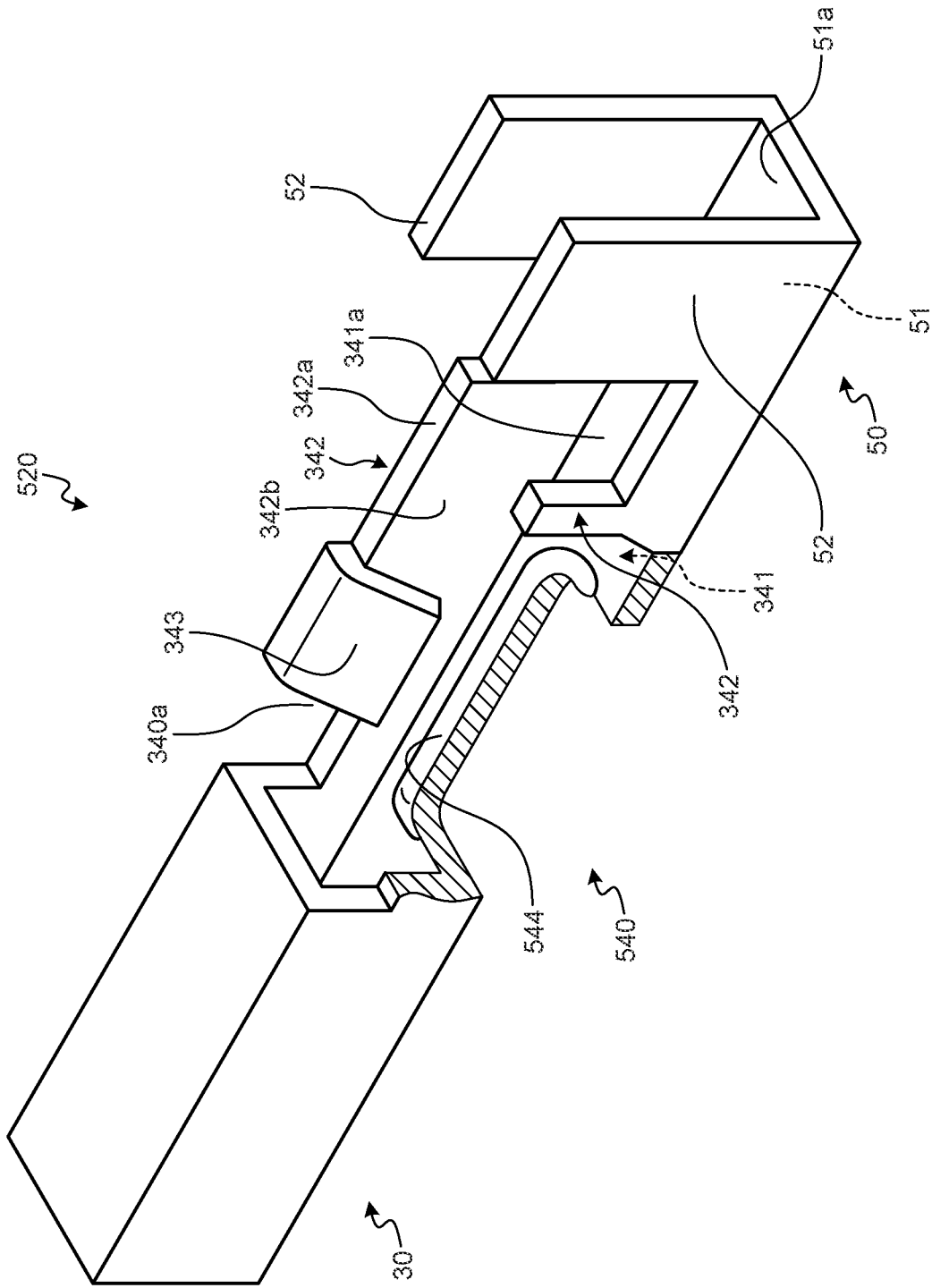
FIG. 20 is a perspective partially cross-sectional view illustrating the terminal fitting of the fifth modification.
Figure 21:
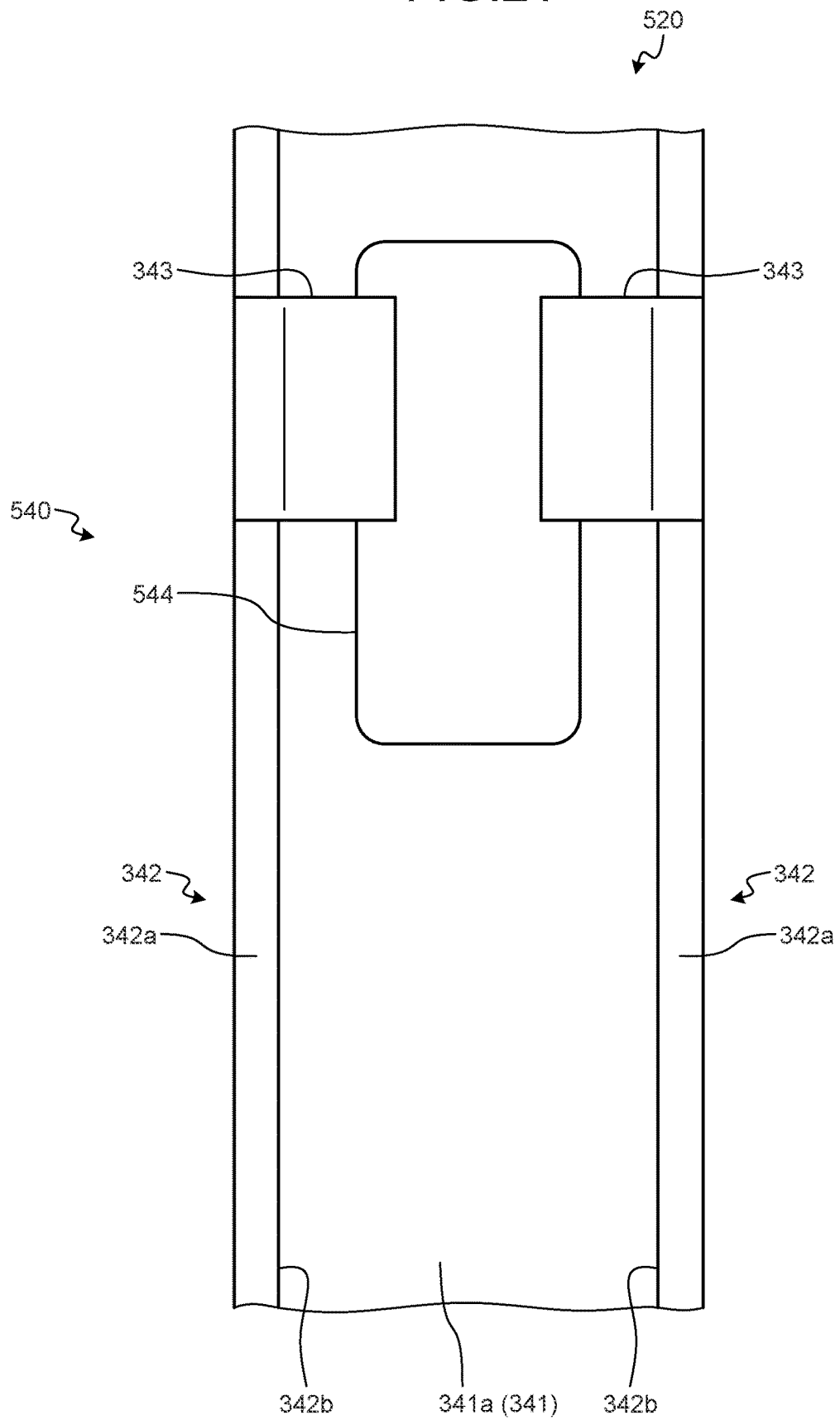
FIG. 21 is a plan view of the terminal fitting of the fifth modification when viewed from an opening side.
Figure 22:
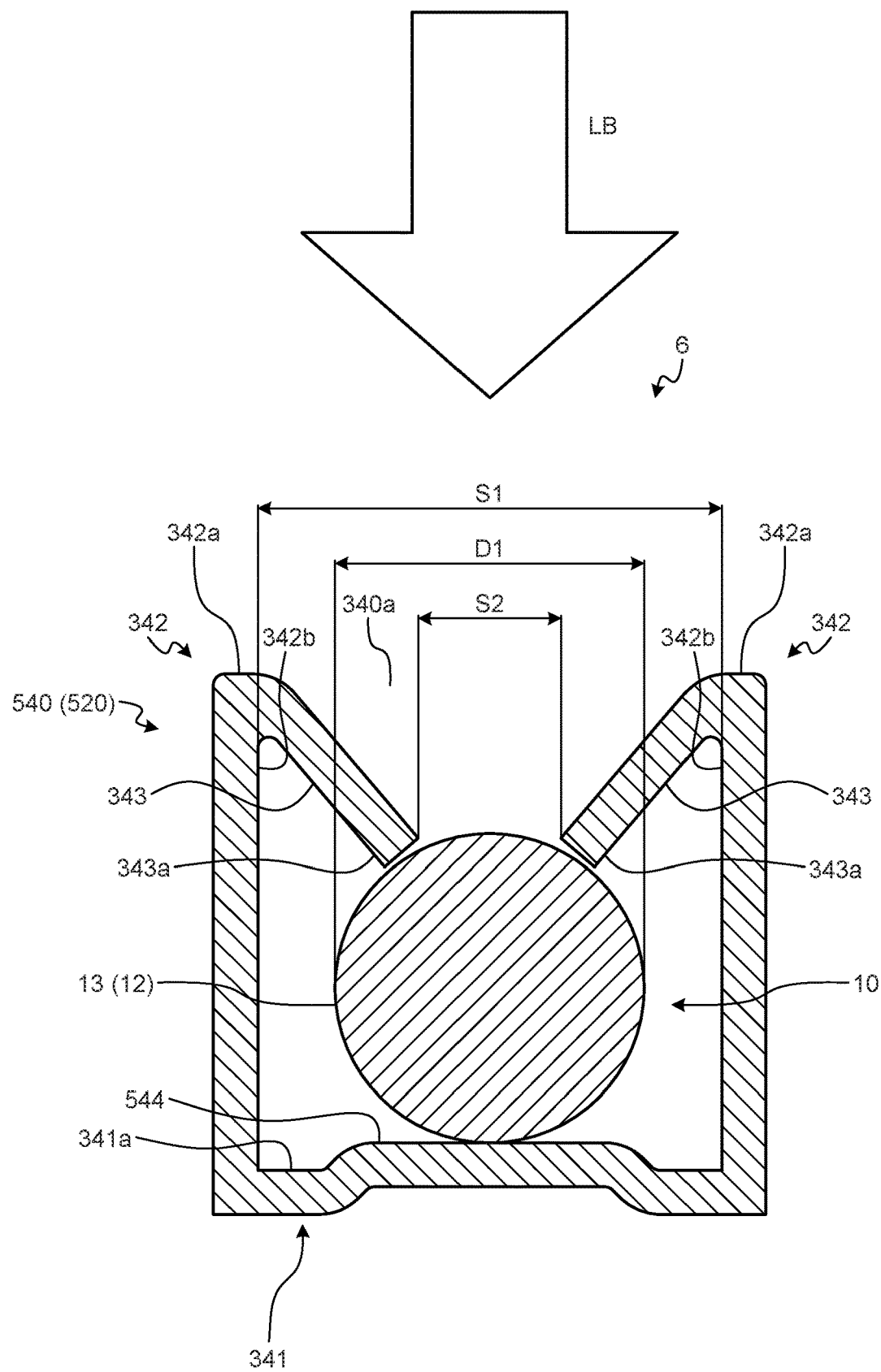
FIG. 22 is a cross-sectional view illustrating the core-wire exposed part and a core-wire connection body of the fifth modification before being melted in the melting step.

A terminal-equipped electric wire manufacturing method of the present modification manufactures a terminal-equipped electric wire 5 in which a terminal fitting 420 to be described later is attached to the terminal of the electric wire 10 (FIGS. 16 to 18).

The terminal fitting 420 of the present modification corresponds to, for example, the terminal fitting 320 of the third modification described above in which at least the core-wire connection body 340 is replaced with a core-wire connection body 440 to be described later (FIGS. 16 and 17). The core-wire connection body 440 corresponds to the core-wire connection body 340 of the third modification that includes a bottom part 441 and a pair of piece parts 442, 442 similar to the bottom part 341 and the pair of piece parts 342, 342 and in which the holding parts 343, 343 of the core-wire connection body 340 of the third modification are replaced with holding parts 443, 443 described later.

Similarly to the holding parts 343, 343 of the third modification, the holding parts 443, 443 temporarily hold the core-wire exposed part 13 housed in the inner space between inner wall surfaces 442b, 442b of the respective piece parts 442, 442. The holding parts 443, 443 protrude from the inner wall surface 442b, 442b sides of the piece parts 442, 442 and are oppositely disposed in the opposite disposition direction of the piece parts 442, 442 (FIGS. 16 and 17). Similarly to the holding parts 343, 343 of the third modification, the holding parts 443, 443 sandwich the core-wire exposed part 13 on an opening 440a side of free end 442a, 442a sides of the respective piece parts 442, 442 and on the bottom part 441 side compared to end parts on the laser beam irradiation side. Specifically, the holding parts 443, 443 of the present modification are disposed opposite to an inner wall surface (bottom surface) 441a of the bottom part 441 to sandwich the core-wire exposed part 13 between each holding part 443, 443 and the bottom part 441 so that the core-wire exposed part 13 is temporarily held between the inner wall surfaces 442b, 442b of the piece parts 442, 442. Accordingly, in the core-wire connection body 440 of the present modification, the core-wire exposed part 13 is sandwiched between each holding part 443, 443 and the bottom part 441 on the bottom part 441 side of the holding parts 443, 443.

Specifically, each holding part 443, 443 of the present modification is formed in a shape similar to the shape of each holding parts 343, 343 of the third modification, but unlike the holding part 343, 343, the holding part 443, 443 is formed by providing a cut to the corresponding piece part 442, 442 on the opening 440a side except for one side thereof and bending a piece body surrounded by a cut from the one side (FIGS. 16 and 17). In the present modification as well, the holding parts 443, 443 sandwich the core-wire exposed part 13 between each free end 443a, 443a and the bottom part 441, and thus the minimum interval S2 in the opposite disposition direction of the free ends 443a, 443a is set to be smaller than the core-wire diameter D1 of the core wire 12 (core-wire exposed part 13). The core-wire connection body 440 includes one pair of the holding parts 443, 443.

The electric wire installation step, the melting step, and the fixation step of the present modification are performed similarly to the electric wire installation step, the melting step, and the fixation step of the third modification. Accordingly, in the terminal-equipped electric wire manufacturing method and the terminal-equipped electric wire 5 of the present modification, a melted-fixed part 5A substantially divided into a first fixation region 5a and a second fixation region 5b is formed similarly to the melted-fixed part 4A of the third modification, and protrusion parts 443X each including a solidified surface 443b are formed similarly to the core-wire connection body 340 of the third modification (FIG. 18). In the drawing, a boundary region 5c between the first fixation region 5a and the second fixation region 5b is illustrated with a dashed and double-dotted line as described above.

The terminal-equipped electric wire manufacturing method and the terminal-equipped electric wire 5 of the present modification as described above can achieve effects same as those of the terminal-equipped electric wire manufacturing method and the terminal-equipped electric wire 4 of the third modification.

Fifth Modification

A terminal-equipped electric wire manufacturing method of the present modification manufactures a terminal-equipped electric wire 6 in which a terminal fitting 520 to be described later is attached to the terminal of the electric wire 10 (FIGS. 19 to 25).

In the terminal fitting 320 or 420 of the third or the fourth modification described above, the core-wire exposed part 13 is sandwiched between each holding part 343, 343, or 443, 443 and the bottom part 341 or 441. However, in the terminal fitting 320 or 420, the inner wall surface 341a or 441a of the bottom part 341 or 441 of the core-wire connection body 340 or 440 and the inner wall surface 51a of the barrel bottom part 51 of the cover connection body 50 are positioned on an identical plane. Thus, in the electric wire installation step of the third and the fourth modifications, the core-wire exposed part 13 potentially floats above the inner wall surface 341a or 441a of the bottom part 341 or 441 by at least the thickness of the cover 11, depending on the length and weight of the core-wire exposed part 13. In the melting and fixation steps of the third and the fourth modifications in a case of such floating of the core-wire exposed part 13, the melted core-wire exposed part 13 or the like falls on the inner wall surface 341a or 441a of the bottom part 341 or 441, the leading end side of the core-wire exposed part 13 declines, and the core-wire exposed part 13 is fixed in this state. Accordingly, in the terminal-equipped electric wire 3 or 4 of the third or the fourth modification, stress potentially concentrates on a boundary part between the core-wire exposed part 13 and the melted-fixed part 4A or 5A.

The terminal-equipped electric wire manufacturing method and the terminal-equipped electric wire 6 of the present modification are configured to prevent occurrence of such stress concentration. The following description will be made with an example of an improved version of the terminal-equipped electric wire 4 of the third modification. However, in the terminal-equipped electric wire 5 of the fourth modification, a component (core-wire lock part 544) to be described later, which is added to the terminal fitting 320 of the third modification, may be added to the terminal fitting 420 of the fourth modification, thereby making it possible to achieve effects same as those of a terminal-equipped electric wire 6 of the present modification as the improved version of the terminal-equipped electric wire 4 of the third modification.

The terminal fitting 520 of the present modification corresponds to the terminal fitting 320 of the third modification described above in which at least the core-wire connection body 340 is replaced with a core-wire connection body 540 to be described later (FIGS. 19 to 25). The core-wire connection body 540 of the present modification is the core-wire connection body 340 of the third modification in which the lock part (hereinafter referred to as "core-wire lock part") 544 that protrudes from the inner wall surface 341a and on which the core-wire exposed part 13 is placed and locked is provided at at least a part of the bottom part 341 disposed opposite to the holding parts 343, 343.

A height by which the core-wire lock part 544 protrudes from the bottom part 341 is set to be equal to the thickness of the cover 11, thereby preventing the core-wire exposed part 13 from floating above the inner wall surface 341a of the bottom part 341. In the core-wire connection body 540 of the present modification, the core-wire exposed part 13 is sandwiched between each holding part 343, 343 and the core-wire lock part 544. The core-wire lock part 544 in this example extends to the cover 11 side beyond the irradiation range of the laser beam LB in the axis line direction of the core-wire exposed part 13.

Figure 23:
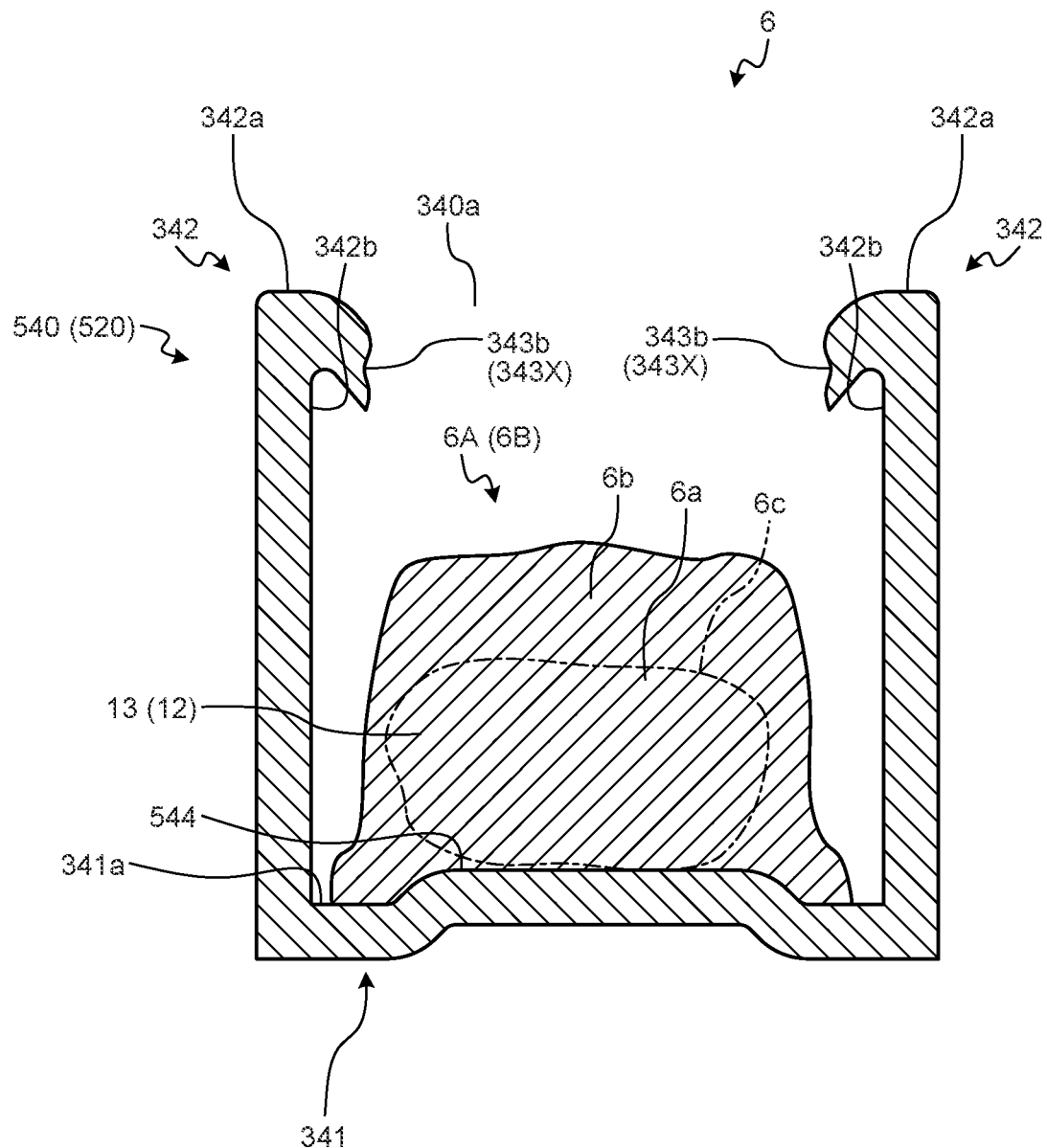
FIG. 23 is a cross-sectional view illustrating the core-wire exposed part and the core-wire connection body of the fifth modification subjected to the fixation step.
Figure 24:
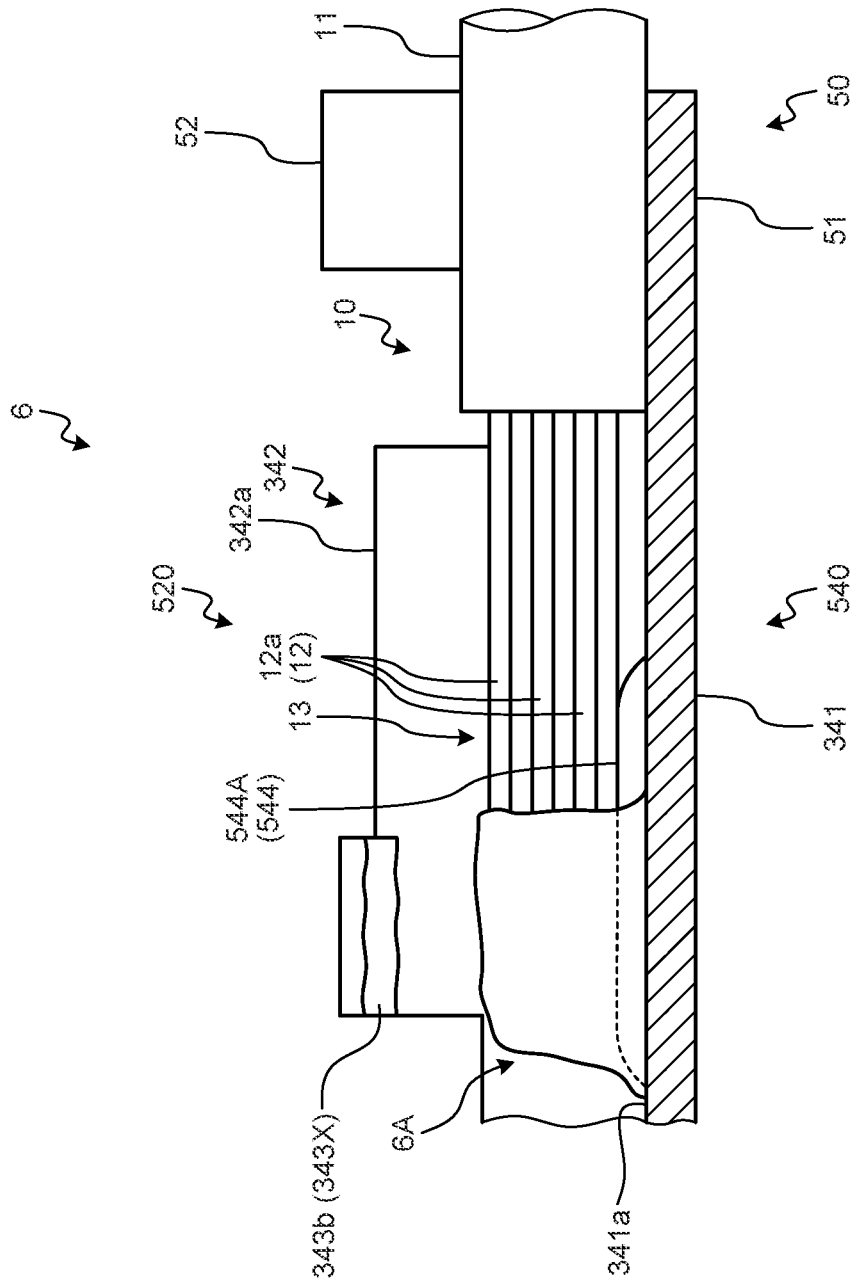
FIG. 24 is a diagram illustrating an example of the inside of the core-wire connection body of the fifth modification subjected to the fixation step.
Figure 25:
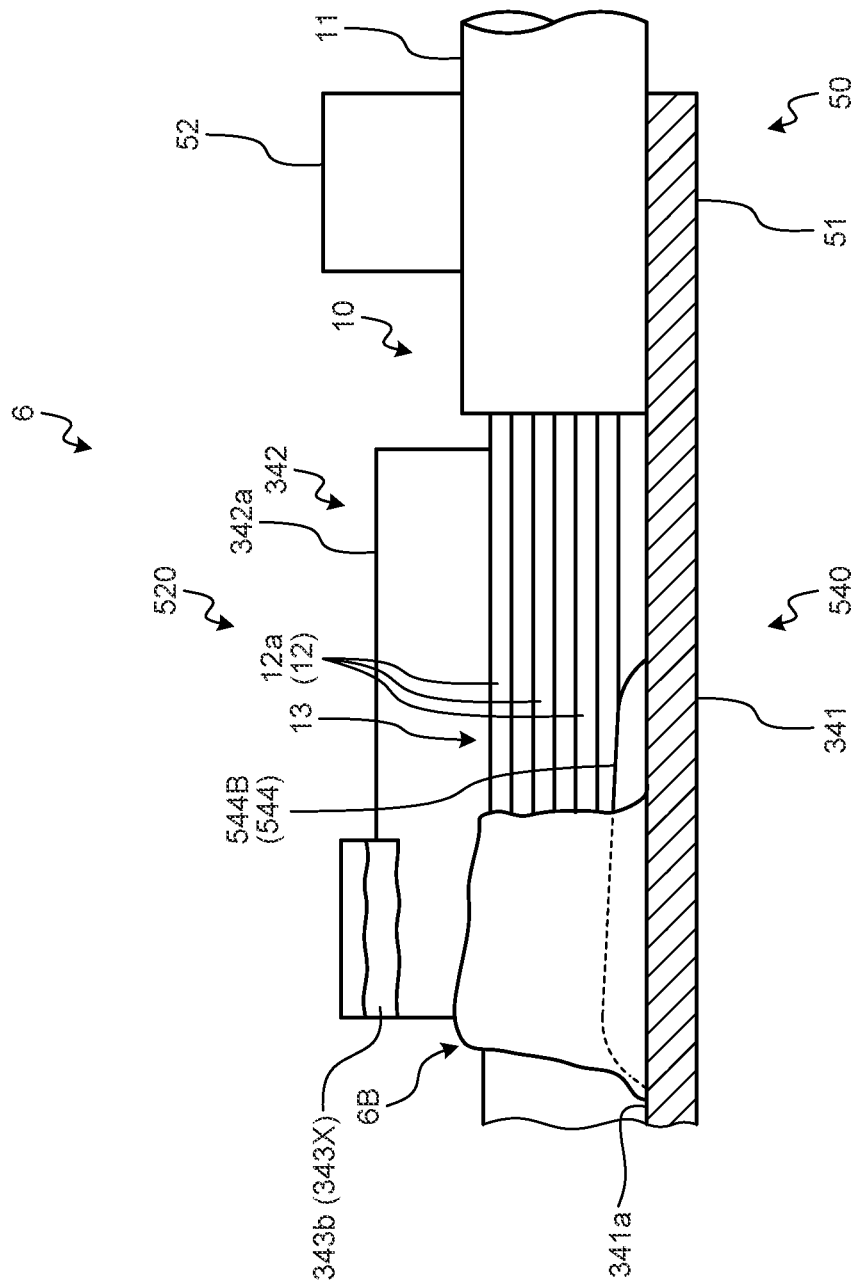
FIG. 25 is a diagram illustrating another example of the inside of the core-wire connection body of the fifth modification subjected to the fixation step.

The electric wire installation step, the melting step, and the fixation step of the present modification are performed similarly to the electric wire installation step, the melting step, and the fixation step of the third modification. However, in the melting step of the present modification, the core-wire lock part 544 functions as a support to prevent the melted core-wire exposed part 13 or the like from falling on the inner wall surface 341a of the bottom part 341 (FIGS. 23 to 25). Accordingly, in the terminal-equipped electric wire manufacturing method and the terminal-equipped electric wire 6 of the present modification, melted-fixed parts 6A and 6B with less decline to the bottom part 341 side are formed. The melted-fixed parts 6A and 6B are substantially divided into a first fixation region 6a of the melted core-wire exposed part 13 and a second fixation region 6b of the melted holding parts 343, 343, which contains a metallic material same as that of the core-wire connection body 340. In the drawing, a boundary region 6c between the first fixation region 6a and the second fixation region 6b is illustrated with a dashed and double-dotted line as described above. In the present modification as well, in the terminal-equipped electric wire manufacturing method and the terminal-equipped electric wire 6, the protrusion parts 343X each including the solidified surface 343b same as that the core-wire connection body 340 of the third modification are formed.

In this manner, with the terminal-equipped electric wire manufacturing method and the terminal-equipped electric wire 6 of the present modification, it is possible to prevent stress concentration at a boundary part between the core-wire exposed part 13 and each of the melted-fixed parts 6A and 6B. Thus, the terminal-equipped electric wire manufacturing method and the terminal-equipped electric wire 6 of the present modification can achieve effects same as those of the terminal-equipped electric wire manufacturing method and the terminal-equipped electric wire 4 of the third modification, but are more likely to maintain the state of connection between the core-wire exposed part 13 and the core-wire connection body 340 than the terminal-equipped electric wire manufacturing method and the terminal-equipped electric wire 4 of the third modification, and thus can achieve more stable conduction quality.

The protrusion height of the core-wire lock part 544 from the bottom part 341 may be constant (a core-wire lock part 544A in FIG. 24). Alternatively, for example, the protrusion height of the core-wire lock part 544 (a core-wire lock part 544B in FIG. 25) may be higher on the leading end side of the core-wire exposed part 13 than on the cover 11 side of the core-wire exposed part 13 to prevent the melted core-wire exposed part 13 or the like from flowing to the terminal connection body 30 side. The core-wire lock part 544B can form a melted-fixed part 6B as a result of the prevention of the melted core-wire exposed part 13 or the like from flowing to the terminal connection body 30 side, thereby making it possible to further prevent stress concentration at the boundary part between the core-wire exposed part 13 and the melted-fixed part 6A. Thus, the core-wire lock part 544B contributes to further stabilization of the conduction quality.

In the terminal-equipped electric wire manufacturing method and the terminal-equipped electric wires 1 and 2 of the above-described embodiment or the first and the second modifications, the core-wire exposed part 13 is sandwiched in the opposite disposition direction of the piece parts 42, 42, 142, 142, 242, and 242, and thus decline of the core-wire exposed part 13 and the like after melting is smaller than in the terminal-equipped electric wire manufacturing method and the terminal-equipped electric wires 3 and 4 of the third and the fourth modifications, which depends on the degree of melting of the core-wire exposed part 13 and the like. However, in the core-wire connection bodies 40, 140, and 240 of the embodiment and the first and the second modifications as well, the core-wire lock part 544 of the present modification, which protrudes from the inner wall surfaces 41a, 141a, and 241a may be provided at the bottom parts 41, 141, and 241 to achieve further stabilization of the conduction quality.

Figure 26:
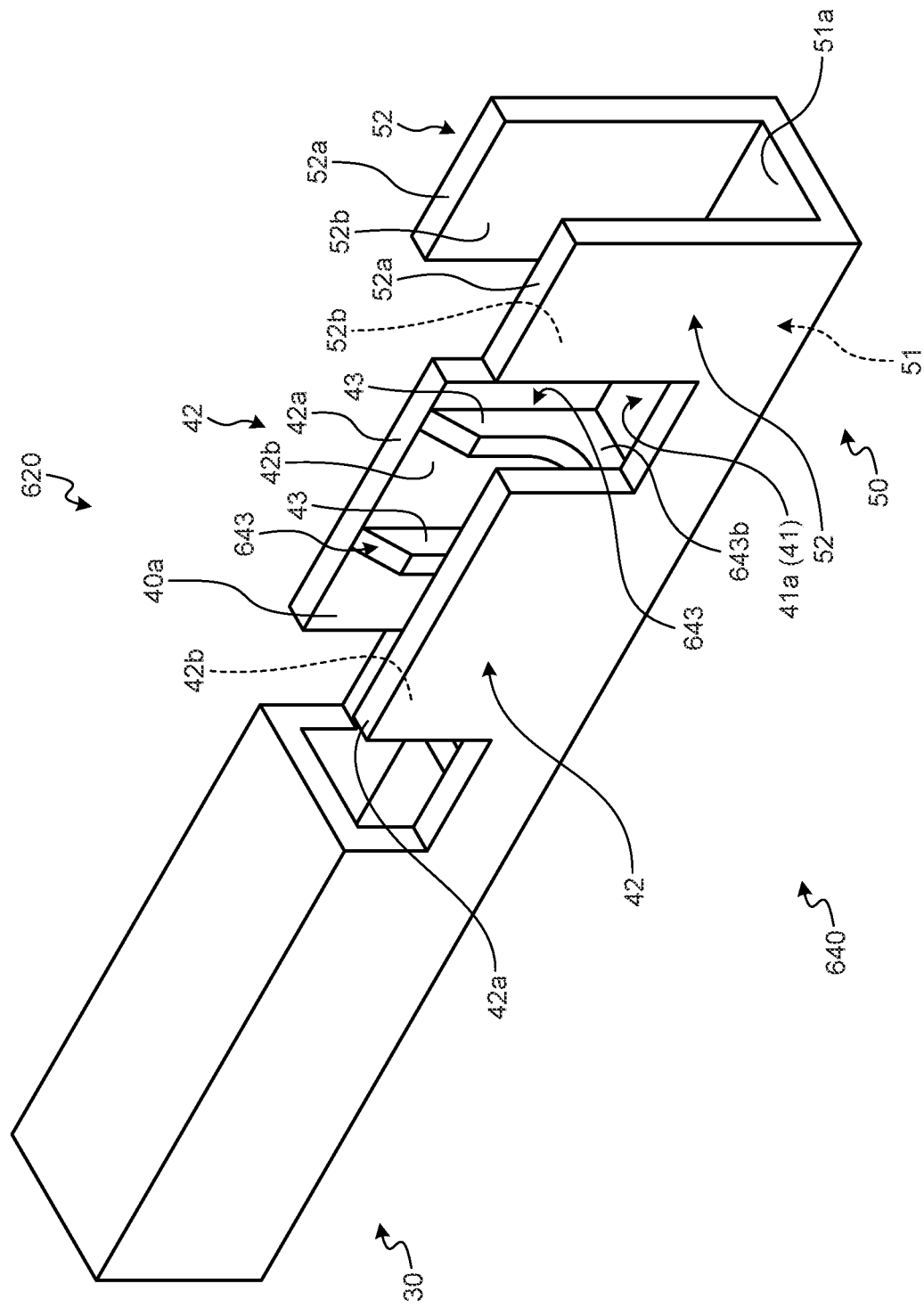
FIG. 26 is a perspective view illustrating a terminal fitting in a modified form of the fifth modification.
Figure 27:
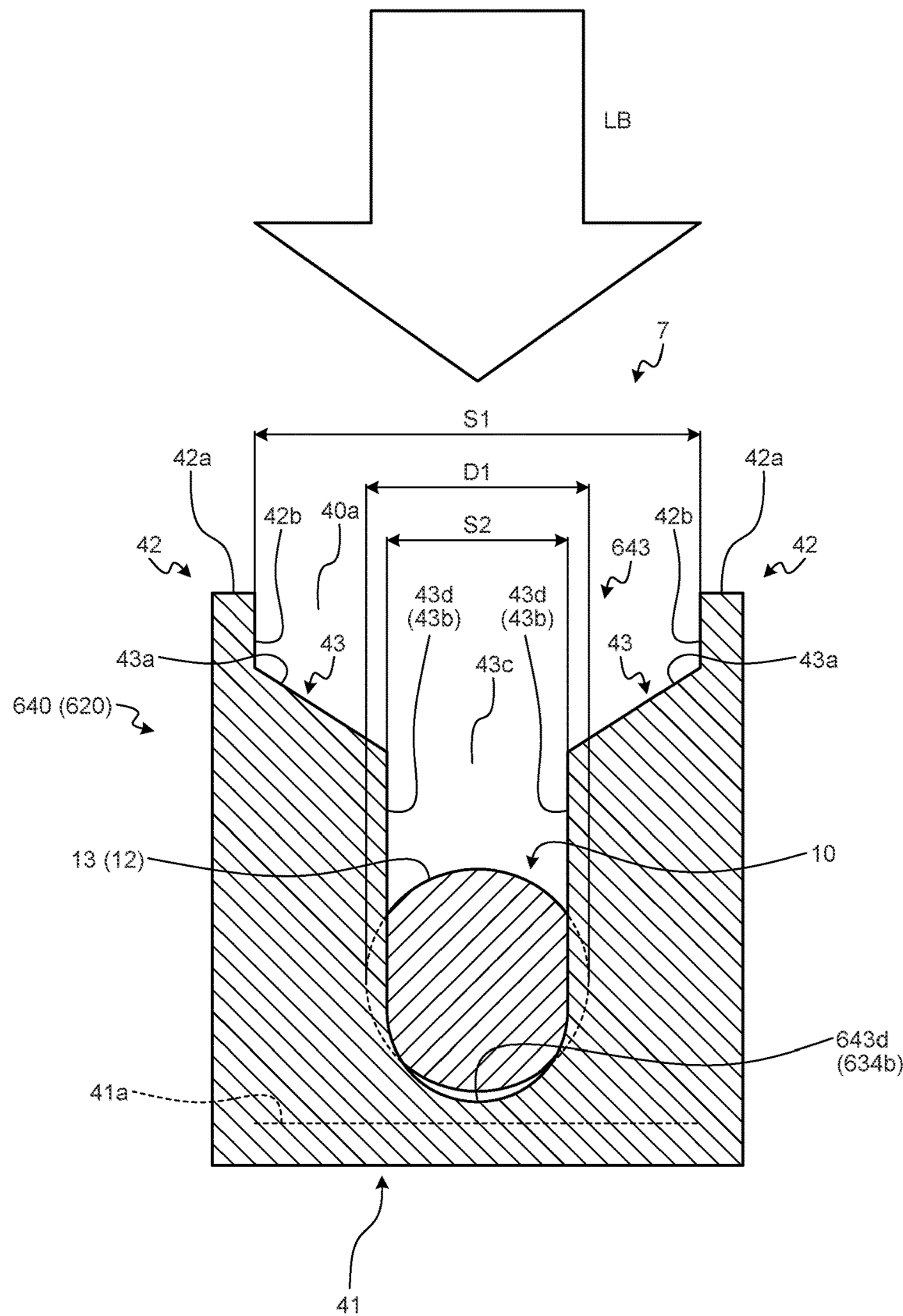
FIG. 27 is a cross-sectional view illustrating the core-wire exposed part and a core-wire connection body in the modified form in the fifth modification before being melted in the melting step.

Alternatively, a terminal fitting 620 in which the core-wire connection body 40 of the embodiment is replaced with a core-wire connection body 640 to be described later may be used to reduce decline of the core-wire exposed part 13 and the like after melting, thereby achieving further stabilization of the conduction quality of a terminal-equipped electric wire 7 (FIGS. 26 and 27).

The core-wire connection body 640 is the core-wire connection body 40 of the embodiment in which a lock part (core-wire lock part) 643b on which the core-wire exposed part 13 sandwiched between the holding parts 43, 43 is placed and locked is provided between the holding parts 43, 43 and on the bottom part 41 side (FIGS. 26 and 27). The core-wire lock part 643b includes an arc end face 643d having a wall surface facing the opening 40a side of each piece part 42, 42, and end parts of the end face 643d in the circumferential direction are continuously provided with the respective end faces 43d, 43d of the press fitting parts 43b, 43b. In this example, the end faces 43d, 43d and 643d each have a U-shaped wall surface. The core-wire exposed part 13 is sandwiched between the end faces 43d, 43d, and the core-wire exposed part 13 thus sandwiched is placed on the end face 643d. Accordingly, a core-wire holding part 643 including the holding parts 43, 43 and the core-wire lock part 643b is formed in the inner space of the core-wire connection body 640. The end face 643d in this example is formed as a press contact blade like the end faces 43d, 43d.

In the terminal fitting 620, the inner wall surface 41a of the bottom part 41 of the core-wire connection body 640 and the inner wall surface 51a of the barrel bottom part 51 of the cover connection body 50 are positioned on an identical plane. Thus, the height of a part (lowermost surface) of the end face 643d, which is closest to the bottom part 41, from the inner wall surface 41a of the bottom part 41 is set to be equivalent to the thickness of the cover 11. Accordingly, the core-wire lock part 643b has a function equivalent to that of the above-described core-wire lock part 544. Thus, the terminal-equipped electric wire manufacturing method and the terminal-equipped electric wire 7 of the present modification can achieve effects same as those of the terminal-equipped electric wire manufacturing method and the terminal-equipped electric wire 6 using the core-wire lock part 544.

In a terminal-equipped electric wire manufacturing method and a terminal-equipped electric wire according to the present embodiment, a laser beam is emitted to an inner space of a core-wire connection body to weld a core-wire exposed part and holding parts in the space. Thus, in the terminal-equipped electric wire manufacturing method and the terminal-equipped electric wire, it is possible to irradiate a welding target with the laser beam of a desired intensity without thermally affecting a peripheral part such as a housing described above, thereby solidly welding the core-wire exposed part and the holding parts. Moreover, in the terminal-equipped electric wire manufacturing method and the terminal-equipped electric wire according to the present embodiment, the core-wire exposed part and the holding parts temporarily holding the core-wire exposed part are welded in the inner space of the core-wire connection body, and thus it is easy to set the irradiation range of the laser beam and it is possible to achieve stable welding between the parts. As described above, in the terminal-equipped electric wire manufacturing method and the terminal-equipped electric wire according to the present embodiment, the core-wire exposed part and the core-wire connection body are connected with each other in a desirable and stable state, thereby making it possible to improve the quality of conduction between the electric wire and a terminal fitting.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal-equipped electric wire manufacturing method comprising:
   an electric wire installation step of inserting a core-wire exposed part of a core wire of an electric wire at a terminal between inner wall surfaces of a pair of piece parts of a terminal fitting including a core-wire connection body formed of a bottom part and the piece parts protruding from both ends of the bottom part, the electric wire having a core-wire diameter smaller than an interval between the inner wall surfaces of the piece parts;
   a melting step of melting the core-wire exposed part and the core-wire connection body by emitting a laser beam to the core-wire exposed part and the core-wire connection body from a free end side of each piece part; and
   a fixation step of fixing the core-wire exposed part and the core-wire connection body melted by the laser beam, with the emission of the laser beam stopped, wherein at the electric wire installation step, the core-wire exposed part is inserted between the inner wall surfaces of the piece parts, disposed on a bottom part side compared to an end part of a holding part of the core-wire connection body on a laser beam irradiation side, and temporarily held to the core-wire connection body by the holding part, at the melting step, the laser beam is emitted to the core-wire exposed part and the holding part to melt the core-wire exposed part and the holding part, and at the fixation step, the core-wire exposed part and the holding part melted by the laser beam are fixed.

2. The terminal-equipped electric wire manufacturing method according to claim 1, wherein at the electric wire installation step, the core-wire exposed part is sandwiched between the holding parts protruding from inner wall surface sides of the piece parts and oppositely disposed in an opposite disposition direction of the piece parts.

3. The terminal-equipped electric wire manufacturing method according to claim 1, wherein at the electric wire installation step, the core-wire exposed part is sandwiched between the bottom part and each of the holding parts protruding from inner wall surface sides of the piece parts and disposed opposite to an inner wall surface of the bottom part.

4. The terminal-equipped electric wire manufacturing method according to claim 1, wherein at the electric wire installation step, the core-wire exposed part of the core wire including a plurality of strands is inserted between the inner wall surfaces of the piece parts.

5. The terminal-equipped electric wire manufacturing method according to claim 2, wherein at the electric wire installation step, the core-wire exposed part of the core wire including a plurality of strands is inserted between the inner wall surfaces of the piece parts.

6. The terminal-equipped electric wire manufacturing method according to claim 3, wherein at the electric wire installation step, the core-wire exposed part of the core wire including a plurality of strands is inserted between the inner wall surfaces of the piece parts.

* * * * *